United States Patent
Kimura et al.

(10) Patent No.: US 8,522,914 B2
(45) Date of Patent: Sep. 3, 2013

(54) PUMP APPARATUS AND CONTROL METHOD FOR CONTROLLING THE PUMP APPARATUS

(75) Inventors: Makoto Kimura, Yokohama (JP); Satoshi Nonaka, Atsugi (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 293 days.

(21) Appl. No.: 12/949,311

(22) Filed: Nov. 18, 2010

(65) Prior Publication Data
US 2011/0150672 A1 Jun. 23, 2011

(30) Foreign Application Priority Data
Dec. 21, 2009 (JP) ................. 2009-288784

(51) Int. Cl.
*B62D 5/14* (2006.01)
(52) U.S. Cl.
USPC .......................... 180/421; 180/417
(58) Field of Classification Search
USPC ................................ 180/421, 417
See application file for complete search history.

(56) References Cited

U.S. PATENT DOCUMENTS

| | | | | |
|---|---|---|---|---|
| 4,496,288 A | * | 1/1985 | Nakamura et al. | 417/213 |
| 4,601,641 A | * | 7/1986 | Kuroyanagi et al. | 417/220 |
| 6,470,992 B2 | * | 10/2002 | Nissen et al. | 180/429 |
| 6,817,438 B2 | * | 11/2004 | Modrzejewski et al. | 180/429 |
| 6,913,446 B2 | * | 7/2005 | Nissen et al. | 417/53 |
| 7,857,092 B2 | * | 12/2010 | Kurata | 180/417 |

FOREIGN PATENT DOCUMENTS

JP 2007-092761 A 4/2007

* cited by examiner

*Primary Examiner* — Kevin Hurley
*Assistant Examiner* — Michael Stabley
(74) *Attorney, Agent, or Firm* — Foley & Lardner LLP

(57) ABSTRACT

A pump apparatus including a pump housing, a drive shaft, a cam ring movably disposed in the pump housing, a pump element disposed within the cam ring and rotationally driven by the drive shaft to vary a specific discharge quantity which is a discharge quantity of the working oil per one rotation of the pump element in accordance with variation in eccentric amount of the cam ring with respect to the drive shaft, and a solenoid which is drivingly controlled on the basis of a steering condition and a vehicle speed and operated to control the eccentric amount of the cam ring. The solenoid is controlled to execute a flow rate reduction control during cranking of an engine of the vehicle in which the cam ring is allowed to move in such a direction as to reduce the specific discharge quantity.

13 Claims, 21 Drawing Sheets

PUMP APPARATUS AND CONTROL METHOD FOR CONTROLLING THE PUMP APPARATUS

BACKGROUND OF THE INVENTION

The present invention relates to a pump apparatus for supplying a working fluid to a vehicular steering apparatus and a control method for controlling the pump apparatus.

Japanese Patent Application Unexamined Publication No. 2007-92761 discloses a variable displacement pump for use in a steering apparatus for vehicles. The variable displacement pump of this conventional art includes a control valve which controls a cam ring, and a solenoid which operates and controls the control valve. The variable displacement pump is constructed to increase a discharge quantity when a steering operation is executed, and reduce the discharge quantity when the steering operation is not executed. The thus constructed variable displacement pump aims to enhance a steering performance and reduce a pump load.

SUMMARY OF THE INVENTION

However, in the above-described conventional art fails to take a measure for solving the reduction of a pump load which is caused upon cranking based on an engine starting command.

It is an object of the present invention to provide a pump apparatus capable of attaining good starting of a vehicular engine.

In order to achieve the above object, the pump apparatus of the present invention is constructed to control an eccentric amount of a cam ring with respect to a central axis of a drive shaft so as to reduce a specific discharge quantity of working oil (that is, a discharge quantity of working oil per one rotation of the pump element) during cranking of a vehicular engine.

In one aspect of the present invention, there is provided a pump apparatus for supplying a working fluid to a steering apparatus for a vehicle, the pump apparatus comprising:
  a pump housing having a pump element accommodating portion;
  a drive shaft rotatably supported by the pump housing; a cam ring movably disposed in the pump element accommodating portion;
  a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft, and
  a solenoid which is drivingly controlled on the basis of a steering condition and a vehicle speed, the solenoid being operated to control the eccentric amount of the cam ring,
  wherein the solenoid is controlled to execute a flow rate reduction control during cranking of an engine of the vehicle in which the cam ring is allowed to move in such a direction as to reduce the specific discharge quantity.

In a further aspect of the present invention, there is provided a pump apparatus for supplying a working fluid to a steering apparatus for a vehicle, the pump apparatus comprising:
  a pump housing having a pump element accommodating portion;
  a drive shaft rotatably supported by the pump housing;
  a cam ring movably disposed in the pump element accommodating portion;
  a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft,
  a steering condition detecting means for detecting or calculating a steering angle, a steering angular velocity or a steering angular acceleration and outputting a steering condition detection signal indicative of the steering angle, the steering angular velocity or the steering angular acceleration;
  a solenoid which is operated to control the eccentric amount of the cam ring; and
  a control unit configured to determine a solenoid driving signal to drivingly control the solenoid in accordance with the steering condition detection signal and a vehicle speed and outputs the solenoid driving signal to the solenoid,
  wherein the control unit is configured to control the solenoid so as to allow the cam ring to move in such a direction as to reduce the specific discharge quantity during cranking of an engine of the vehicle.

In a still further aspect of the present invention, there is provided a control method for controlling a pump apparatus to supply a working fluid to a steering apparatus for a vehicle, the pump apparatus including:
  a pump housing having a pump element accommodating portion;
  a drive shaft rotatably supported by the pump housing;
  a cam ring movably disposed in the pump element accommodating portion;
  a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft,
  a steering condition detecting means for detecting or calculating a steering angle, a steering angular velocity or a steering angular acceleration and outputting a steering condition detection signal indicative of the steering angle, the steering angular velocity or the steering angular acceleration;
  a solenoid which is operated to control the eccentric amount of the cam ring so as to increase as the amount of electric current flowing through the solenoid becomes larger; and
  a control unit configured to determine a solenoid driving signal to drivingly control the solenoid in accordance with the steering condition detection signal and a vehicle speed and outputs the solenoid driving signal to the solenoid;
the control method comprising:
a first step of detecting a cranking condition of an engine of the vehicle and keeping on outputting the solenoid driving signal to the solenoid so as to allow the cam ring to move in such a direction as to reduce the eccentric amount during cranking of the engine;

a second step of detecting the cranking condition that the cranking is ended; and a third step of outputting the solenoid driving signal to the solenoid so as to allow the cam ring to move in such a direction as to increase the eccentric amount after the cranking is ended.

According to the present invention, a specific discharge quantity of a working oil which is provided by a pump apparatus is controlled during cranking of the engine, so that a pump load which is caused during the cranking can be reduced.

The other objects and features of this invention will become understood from the following description with reference to the accompanying drawings.

DETAILED DESCRIPTION OF THE INVENTION

Figure 1:
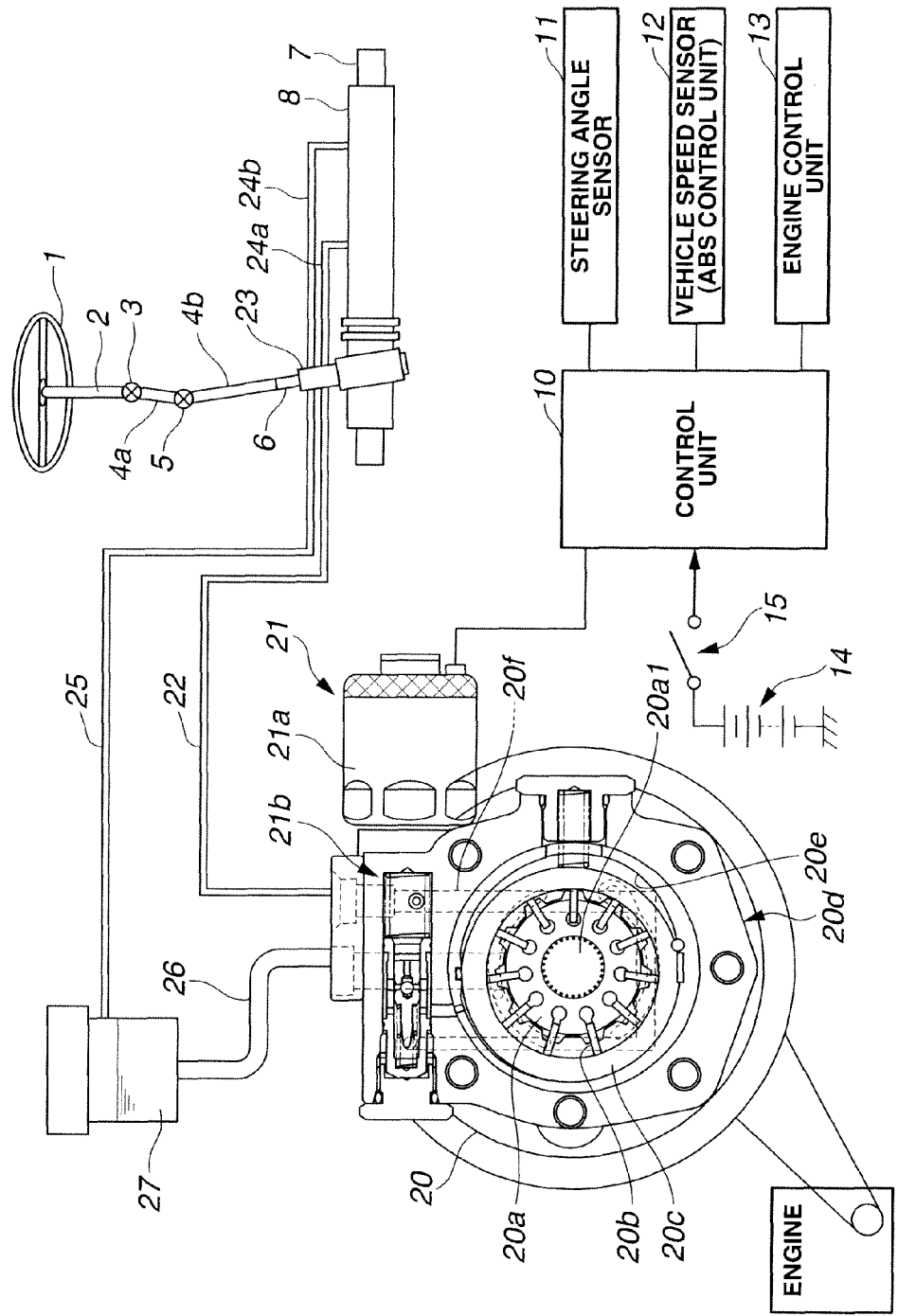
FIG. 1 is a schematic system diagram of a vehicular steering apparatus to which a pump apparatus and a control method therefore according to embodiments of the present invention are applicable.

FIG. 1 is a schematic system diagram showing a vehicular steering apparatus to which a pump apparatus and a control method therefore according to first to twelfth embodiments of the present invention are applicable. As shown in FIG. 1, the steering apparatus includes steering wheel 1 to be operated by a vehicle driver, and steering shaft 2 which is connected at one end thereof to steering wheel 1. Steering shaft 2 is connected at the other end thereof with upper intermediate shaft 4a through universal joint 3. Upper intermediate shaft 4a is also connected with lower intermediate shaft 4b through universal joint 5. Lower intermediate shaft 4b is connected with pinion shaft 6. Pinion shaft 6 is connected with a pinion (not shown) through hydraulic control valve 23 which is operative to hydraulically control power cylinder 8. Hydraulic control valve 23 is so constructed as to selectively change a hydraulic supply passage and a hydraulic supply amount in accordance with a steering torque applied by the vehicle driver.

The pinion is meshed with rack shaft 7 and rotatably moved in accordance with a steering angle applied through steering wheel 1 by the vehicle driver. Rack shaft 7 is movable rightward and leftward in accordance with the rotational angle of the pinion (i.e., the steering angle). Rack shaft 7 includes a piston disposed within power cylinder 8. When rack shaft 7 is allowed to move leftward, a hydraulic pressure is supplied to a right-side power cylinder chamber, whereas when rack shaft 7 is allowed to move rightward, a hydraulic pressure is supplied to a left-side power cylinder chamber, to thereby assist the steering torque applied by the vehicle driver. Rack shaft 7 are connected at both ends thereof to road wheels which are steered in accordance with an operation by the vehicle driver, through tie rods (not shown), etc.

The pump apparatus includes oil pump 20 which is driven by a crankshaft of an engine (not shown) of the vehicle through a timing belt or chain. Oil pump 20 is a variable displacement vane pump and includes drive shaft 20$a$1, rotor 20$a$ which is fitted to and driven by drive shaft 20$a$1 so as to be rotatable in synchronization with rotation of the engine, plate-shaped vanes 20$b$ movably disposed on an outer circumferential periphery of rotor 20$a$ so as to project from and retreat into the outer circumferential periphery of rotor 20$a$ in a radial direction of rotor 20$a$, and cam ring 20$c$ disposed to be eccentrically moveable with respect to a rotation axis of rotor 20$a$ within a predetermined range. These rotor 20$a$, vanes 20$b$ and cam ring 20$c$ serve as pump elements. The pump apparatus further includes pump housing 20$d$ having pump elements accommodating portion 20$e$ which accommodates the pump element. Drive shaft 20$a$1 is rotatably supported by pump housing 20$d$ and drives rotor 20$a$. Pump housing 20$d$ is provided with solenoid valve 21 which is operated to control an eccentric amount of cam ring 20$c$.

Oil pump 20 includes discharge oil passage 20$f$ on which a metering orifice (not shown) is provided. An opening degree of the metering orifice is variably controlled by solenoid 21$a$ of solenoid valve 21. Control valve 21$b$ includes a control chamber which is disposed on the left side of control valve 21$b$ as shown in FIG. 1 and a discharge pressure chamber which is disposed on the right side of control valve 21$b$ as shown in FIG. 1. The control chamber receives a hydraulic pressure to be supplied to a clearance between an outer circumferential surface of cam ring 20$c$ and an inner circumferential surface of pump housing 20$d$. The control chamber is communicated with an upstream side of the metering orifice. The discharge pressure chamber is supplied with a discharge hydraulic pressure and communicated with a downstream side of the metering orifice (that is, a side of high pressure oil supply passage 22). In an initial state, cam ring 20$c$ is held in a maximum eccentric position in which cam ring 20$c$ has a maximum eccentric amount, by a biasing force of a spring. The eccentric amount of cam ring 20$c$ can be controlled by changing the hydraulic pressure to be introduced into the control chamber in accordance with rotational speed of rotor 20$a$. Further, by controlling the opening degree of the metering orifice, both a discharge flow rate characteristic relative to pump speed (i.e., characteristic of variation in eccentric amount of cam ring 20$c$) and a torque required for driving oil pump 20 can be changed.

Oil pump 20 includes oil supply path 26 through which a working oil in reservoir tank 27 is sucked into oil pump 20, high pressure oil supply passage 22 through which the working oil with high pressure discharged from oil pump 20 is supplied to hydraulic control valve 23, and oil return path 25 through which the working oil discharged from hydraulic control valve 23 is returned to reservoir tank 27. Hydraulic control valve 23 is operated to selectively switch oil supply passage 24$a$ and oil return passage 24$b$ which are connected with the left and right power cylinder chambers of power cylinder 8, respectively, in accordance with the steering torque applied by the vehicle driver. By the selective switching, hydraulic control valve 23 allows fluid communication between oil supply passage 24$a$ and high pressure oil supply passage 22 or between oil return passage 24$b$ and oil return path 25 in accordance with the steering condition.

Control unit 10 receives information inputted from steering angle sensor 11 which detects a steering angle given by the vehicle driver, information inputted from vehicle speed sensor 12 which detects vehicle speed, and information inputted from engine control unit 13 which controls the engine (not shown). Specifically, control unit 10 receives information for determining whether or not cranking is carried out by a self-starting motor, information as to engine speed, and the like which are outputted from engine control unit 13. Control unit 10 is connected with battery 14 through ignition switch 15. When ignition switch 15 is turned on, control unit 10 begins to be energized and executes predetermined control. Incidentally, in a general engine vehicle, cranking at engine starting is carried out for a predetermined period of time by turning a key from the ignition ON position to the start position or pushing a start button by the vehicle driver.

Figure 2:
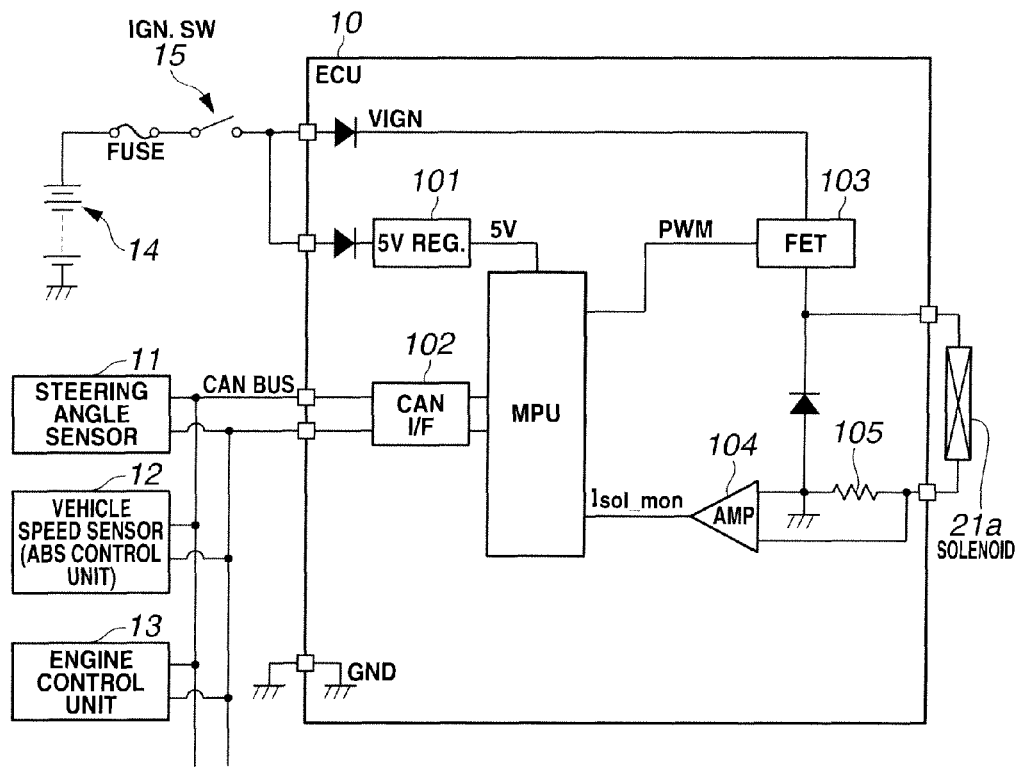
FIG. 2 is a block diagram showing a control system of the vehicular steering apparatus to which the pump apparatus and the control method therefore according to a first embodiment of the present invention is applied.

FIG. 2 is a block diagram showing a control system of the vehicular steering apparatus to which the first embodiment is applied. Steering sensor 11 detects a steering angle given by the vehicle driver and has CAN communication function to transmit the detected values to control unit 10 via CAN line CAN BUS in predetermined time interval. Vehicle sensor 12 is substituted by an ABS control unit which executes control of increase and decrease in wheel cylinder pressure in order to suitably adjust a slip condition of the road wheels. The ABS control unit computes information as to vehicle speed on the basis of a value detected by a road wheel speed sensor (not shown) which is connected to the ABS control unit, and transmits the information as to vehicle speed to control unit 10 via CAN line CAN BUS by the CAN communication function. Engine control unit 13 has CAN communication function and transmits information as to engine cranking and information as to engine speed to control unit 10 via CAN line CAN BUS.

Control unit 10 includes 5V regulator 101 which supplies a constant voltage power supply for operating various microcomputers, CAN interface 102 which manages the CAN communication function, switching device (also referred to as a so-called FET) 103 which serves as a solenoid driving section and converts power supply VIGN to be supplied from battery 14, to a predetermined electric current on the basis of a PWM control signal, shunt resistor 105 which detects actual electric current $I_{real}$ flowing through solenoid 21$a$ and amplifier 104, and microcomputer MPU which executes predetermined calculation and outputs the PWM control signal to switching device 103.

Figure 3:
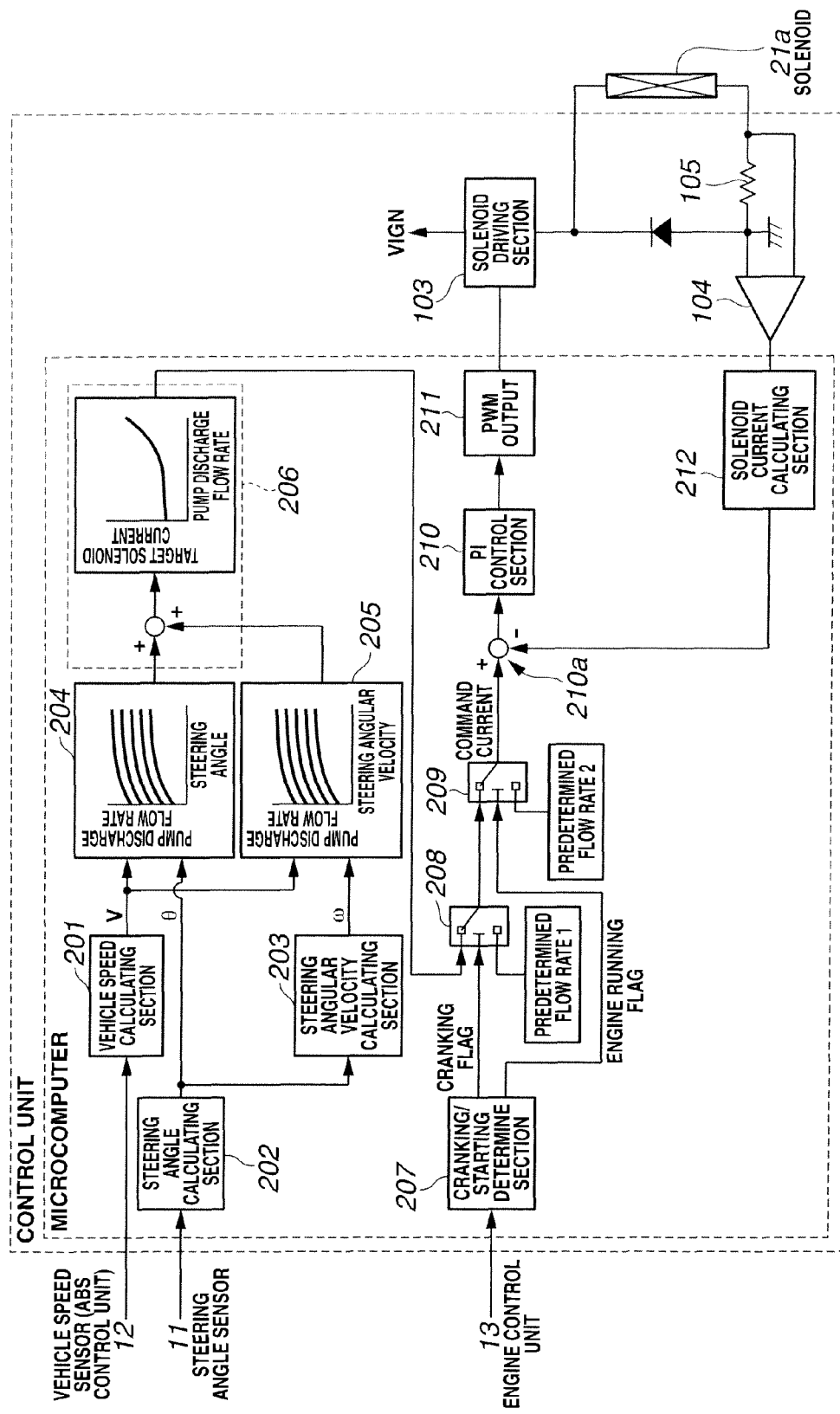
FIG. 3 is a block diagram showing a construction of a microcomputer used in the control system as shown in FIG. 2.

FIG. 3 is a block diagram showing a construction of microcomputer MPU used in the control system of the vehicular steering apparatus to which the first embodiment is applied. Microcomputer MPU includes vehicle speed calculating section 201, steering angle calculating section 202, steering angular velocity calculating section 203, steering angle-to-first pump discharge flow rate calculating section 204, steering angular velocity-to-second pump discharge flow rate calculating section 205, and target current calculating section 206. Vehicle speed calculating section 201 calculates vehicle speed V on the basis of a signal received from vehicle speed sensor 12 through CAN interface 102. Steering angle calculating section 202 calculates steering angle θ on the basis of a signal from steering angle sensor 11. Steering angular velocity calculating section 203 calculates steering angular velocity ω on the basis of the calculated steering angle θ.

Figure 4:
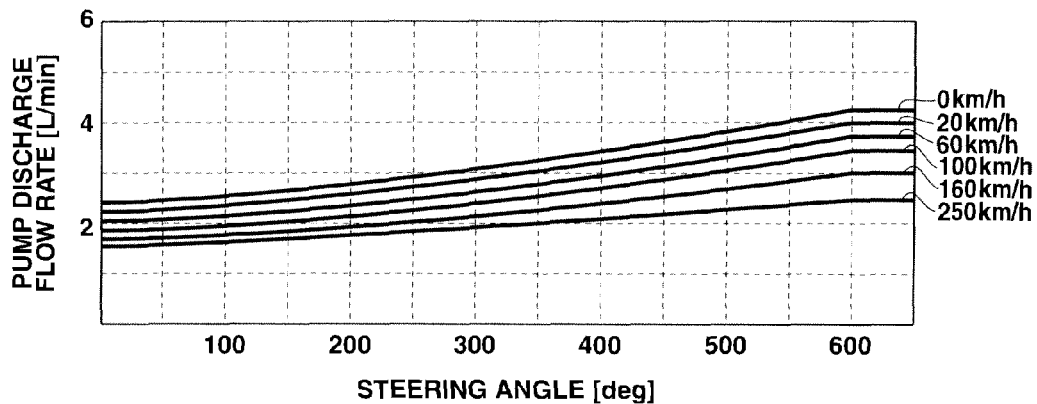
FIG. 4 is a map for computation in a first pump discharge flow rate calculating section for calculating a first pump discharge flow rate with respect to a steering angle in the first embodiment of the present invention.

Steering angle-to-first pump discharge flow rate calculating section 204 sets first pump discharge flow rate (L/min) on the basis of the calculated vehicle speed V (km/h) and the calculated steering angle θ (deg). FIG. 4 shows a map which is computed in steering angle-to-first pump discharge flow rate calculating section 204 and illustrates a relationship between first pump discharge flow rate (L/min) and steering angle θ (deg) as indicated by characteristic curves on the basis of vehicle speed V (km/h). As shown in FIG. 4, when a characteristic curve is selected on the basis of vehicle speed V (km/h), first pump discharge flow rate (L/min) corresponding to steering angle θ (deg) is calculated.

Figure 5:
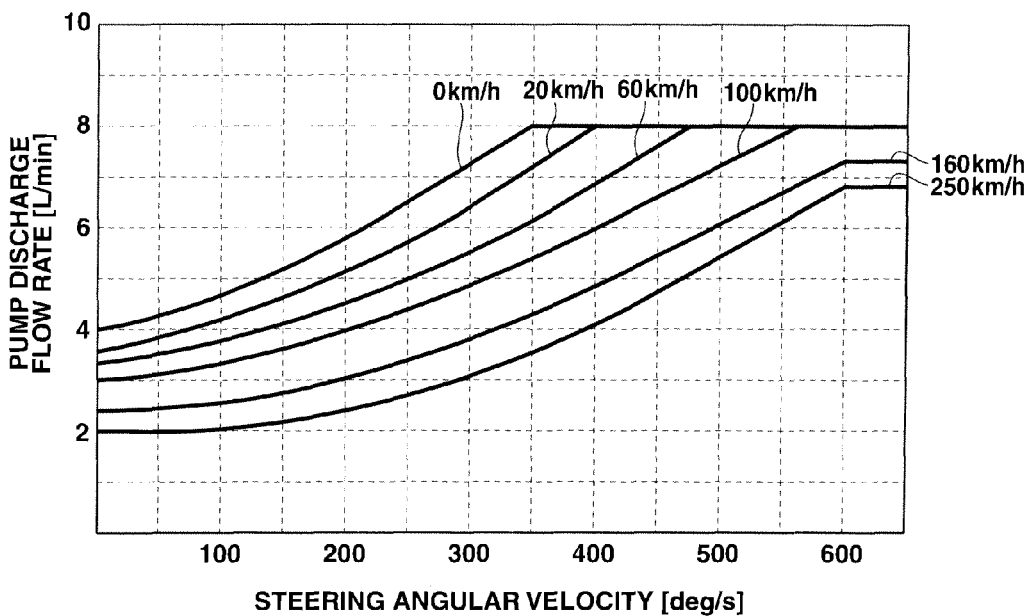
FIG. 5 is a map for computation in a second pump discharge flow rate calculating section for calculating a second pump discharge flow rate with respect to a steering angular velocity in the first embodiment of the present invention.

Steering angular velocity-to-second pump discharge flow rate calculating section 205 sets second pump discharge flow rate (L/min) on the basis of the calculated vehicle speed V (km/h) and the calculated steering angular velocity ω (deg/s). FIG. 5 shows a map which is computed in steering angular velocity-to-second pump discharge flow rate calculating section 205 and illustrates a relationship between second pump discharge flow rate (L/min) and steering angular velocity ω (deg/s) as indicated by characteristic curves on the basis of vehicle speed V (km/h). As shown in FIG. 5, when a characteristic curve is selected on the basis of vehicle speed V (km/h), second pump discharge flow rate (L/min) corresponding to steering angular velocity ω (deg/s) is calculated.

Figure 6:
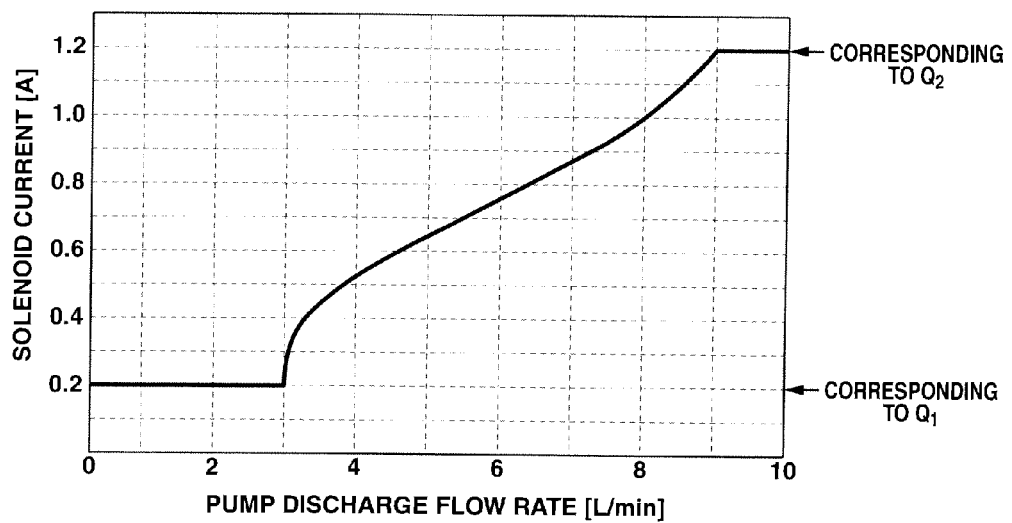
FIG. 6 is a characteristic diagram showing a relationship between a pump discharge flow rate and a solenoid current amount in the first embodiment of the present invention.

Target current calculating section 206 sets a value of target solenoid current which passes through solenoid 21a in accordance with a pump discharge flow rate which is a sum of the first pump discharge flow rate set in steering angle-to-first pump discharge flow rate calculating section 204 and the second pump discharge flow rate set in steering angular velocity-to-second pump discharge flow rate calculating section 205. FIG. 6 is a characteristic diagram showing a relationship between the pump discharge flow rate and the solenoid current in the first embodiment. In a case where drive shaft 20a1 has a constant rotational speed, solenoid 21a is controlled to minimize the specific discharge quantity in the de-energized state and increase the specific discharge quantity as the amount of solenoid current flowing through solenoid 21a becomes larger. In the first embodiment, the specific discharge quantity is calculated on the basis of steering angle θ and steering angular velocity ω. However, the specific discharge quantity may be calculated using steering angular acceleration dω/dt.

Microcomputer MPU further includes cranking/starting determining section 207, first current value switching section 208, second current value switching section 209, deviation computing section 210a, PI control section 210, PWM output section 211 and solenoid current calculating section 212. Cranking/starting determining section 207 executes a processing of determination of cranking/starting of the engine on the basis of the information from engine control unit 13. Specifically, cranking/starting determining section 207 sets cranking flag $F_{cranking}$ and engine running flag $F_{running}$ as explained in detail later.

First flow rate switching section 208 carries out a changeover between the target solenoid current value calculated in target current calculating section 206 and a first target current value which corresponds to predetermined flow rate 1 on the basis of cranking flag $F_{cranking}$. The term "first target current value" means an electric current value lower than such a solenoid current value corresponding to the value of pump discharge flow rate which is calculated under the following conditions: vehicle speed V=0 (km/h), steering angle θ=0 (deg) and steering angular velocity ω=0 (deg/s) under normal control. The predetermined flow rate 1 is equal to minimum discharge flow rate $Q_1$ which is realized by oil pump 20. In the first embodiment, the first pump discharge flow rate is about 2.4 (L/min), the second pump discharge flow rate is about 4 (L/min), a sum of the first and second pump discharge flow rates is about 6.4 (L/min). Therefore, the first target current value is 0.2 (A) lower than about 0.75 (A) corresponding to the sum of the first and second pump discharge flow rates (See FIG. 6).

Second flow rate switching section 209 carries out a changeover between the current value set in first flow rate switching section 208 and a second target current value corresponding to predetermined flow rate 2 on the basis of engine running flag $F_{running}$. The term "second target current value" means an electric current value higher than such a solenoid current value corresponding to the value of pump discharge flow rate which is calculated under the following conditions: vehicle speed V=0 (km/h), steering angle θ=0 (deg) and steering angular velocity ω=0 (deg/s) under normal control. The predetermined flow rate 2 is equal to maximum discharge flow rate $Q_2$ which is realized by oil pump 20. In the first embodiment, the first pump discharge flow rate is about 2.4 (L/min), the second pump discharge flow rate is about 4 (L/min), a sum of the first and second pump discharge flow rates is about 6.4 (L/min). Therefore, the second target current value is 1.2 (A) higher than about 0.75 (A) equivalent to the sum of the first and second pump discharge flow rates (See FIG. 6).

Deviation calculating section 210a computes a deviation of a command current value finally set from actual solenoid current value $I_{real}$ which is calculated by solenoid current calculating section 212. PI control section 210 computes a PWM control amount on the basis of the deviation computed by deviation calculating section 210a. PWM output section 211 outputs a PWM control command signal to switching device 103 which serves as a solenoid driving section, on the basis of the PWM control amount computed by PI control section 210.

Figure 7:
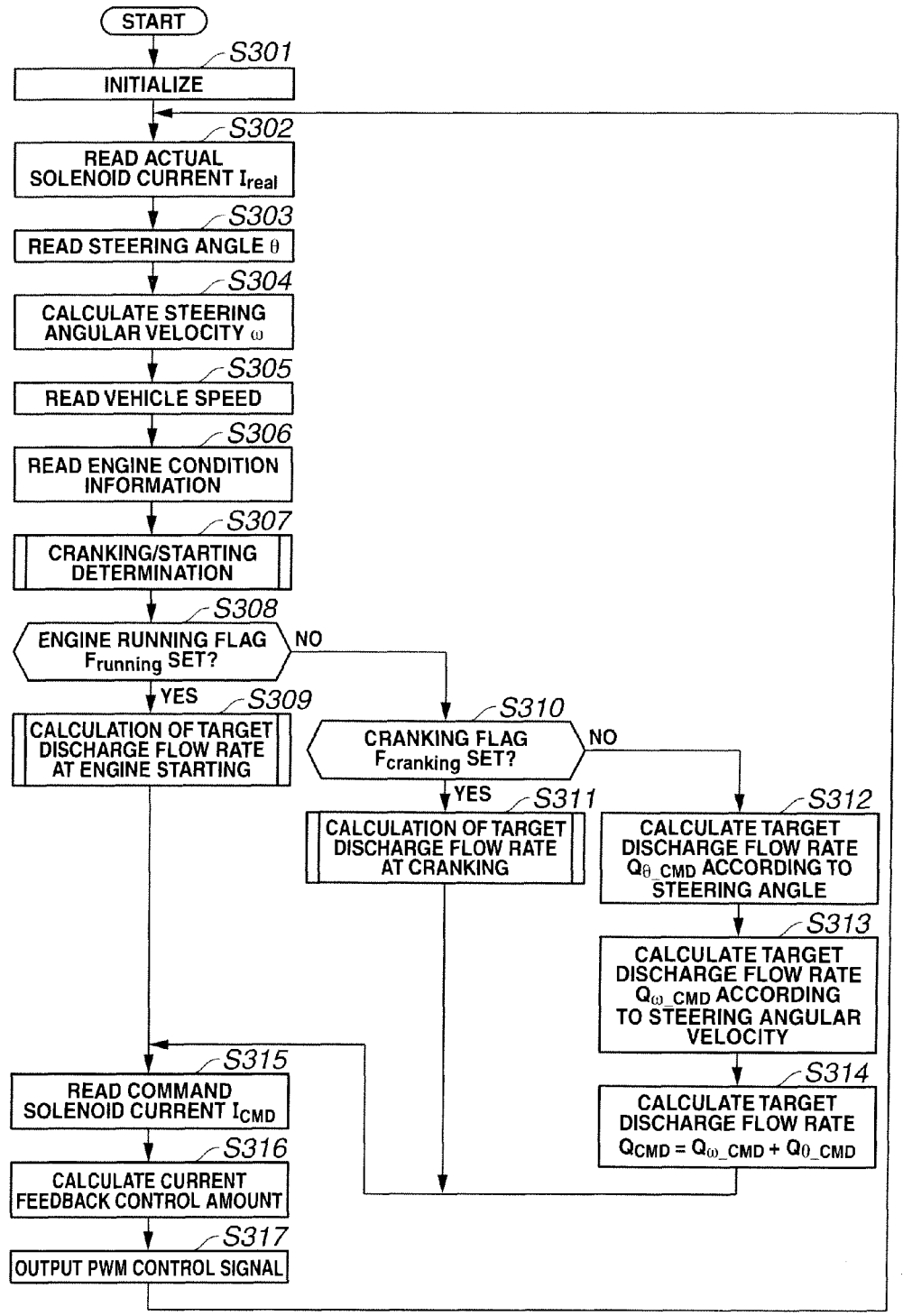
FIG. 7 is a flowchart showing a routine of pump discharge flow rate control which is executed by a control unit in the first embodiment of the present invention.

FIG. 7 is a flowchart showing a routine of pump discharge flow rate control which is executed by control unit 10 in the first embodiment. As shown in FIG. 7, a logic flow of the pump discharge flow rate control goes to step S301 in which initialization is executed. The initialization is a processing to initialize memories, various flags, timers and the like. The logic flow proceeds to step S302 in which actual solenoid current value $I_{real}$ is read. The logic flow then proceeds to step S303 in which steering angle θ is read. The logic flow then proceeds to step S304 in which steering angular velocity ω is calculated. The logic flow then proceeds to step S305 in which vehicle speed V is read. The logic flow then proceeds to step S306 in which information as to an engine condition is read from engine control unit 13. The logic flow then proceeds to step S307 in which cranking/starting determination processing is executed. The cranking/starting determination processing is explained later.

The logic flow then proceeds to step S308 in which a determination is made as to whether or not engine running flag $F_{running}$ is set. In a case where it is determined that engine running flag $F_{running}$ is set, the logic flow proceeds to step S309. In step S309, a processing of calculation of a target discharge flow rate at engine starting (hereinafter referred to as an engine starting target discharge flow rate calculation processing) is executed. Specifically, in step S309, the target discharge flow rate is set to predetermined flow rate 2. This operation in step S309 is equivalent to flow rate increase control. The logic flow then proceeds to step S315 in which command solenoid current $I_{CMD}$ is calculated. The logic flow then proceeds to step S316 in which an electric current feedback control amount is calculated. The logic flow then proceeds to step S317 in which a PWM control signal is outputted. The logic flow then returns to step S302.

In a case where in step S308, it is determined that engine running flag $F_{running}$ is not set, the logic flow proceeds to step S310. In step S310, a determination is made as to whether or not cranking flag $F_{cranking}$ is set. In a case where in step S310, it is determined that cranking flag $F_{cranking}$ is set, the logic flow proceeds to step S311 in which a processing of calculation of target discharge flow rate at cranking is executed. Specifically, in step S311, the target discharge flow rate is set to predetermined flow rate 1. This operation in step S311 is equivalent to flow rate reduction control. The logic flow then proceeds to step S315.

In a case where in step S310, it is determined that cranking flag $F_{cranking}$ is not set, the logic flow proceeds to step S312 in which target discharge flow rate $Q_{\theta\_CMD}$ according to steering angle θ is calculated. The logic flow then proceeds to step S313 in which target discharge flow rate $Q_{\omega\_CMD}$ according to steering angular velocity ω is calculated. The logic flow then proceeds to step S314 in which target discharge flow rate $Q_{CMD}$ is calculated using the following formula (1).

$$Q_{CMD} = Q_{\theta\_CMD} + Q_{\omega\_CMD} \tag{1}$$

The logic flow then proceeds to step S315.

[Cranking/Starting Determination Processing]

Figure 8:
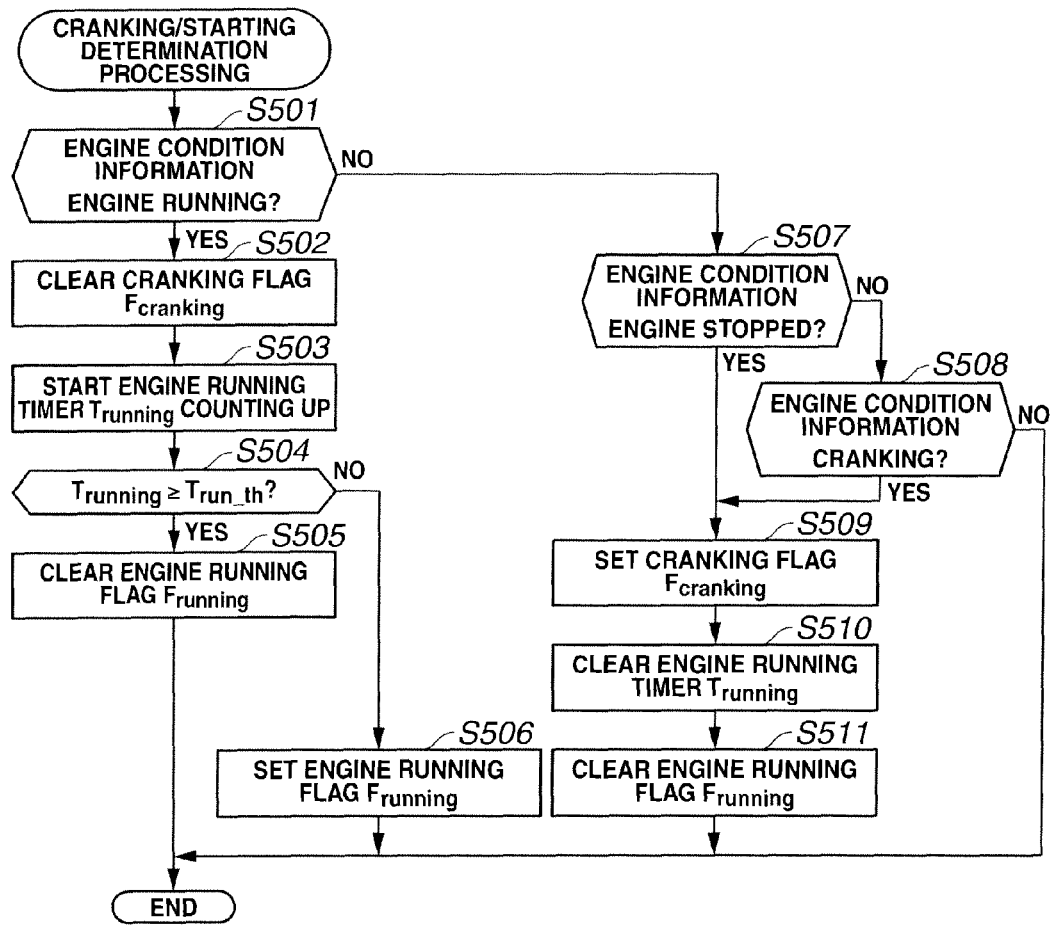
FIG. 8 is a flowchart showing a subroutine of determination of cranking/starting which is executed upon the pump discharge flow rate control in the first embodiment of the present invention.

FIG. 8 is a flowchart showing a subroutine of cranking/starting determination according to the first embodiment, which is executed in step S307 as shown in FIG. 7. As shown in FIG. 8, a logic flow of the cranking/starting determination starts and goes to step S501 in which the information as to an engine condition is obtained and a determination is made as to whether or not the engine is running. Specifically, it is determined whether or not an engine speed value is not less than a predetermined speed value which allows autonomous rotation of the engine. The predetermined speed value is used as a threshold value for determination of autonomous rotation of the engine. In a case where in step S501, it is determined that engine speed value is not less than a predetermined speed value, indicating that the engine is running, the logic flow proceeds to step S502 in which cranking flag $F_{cranking}$ is cleared.

The logic flow then proceeds to step S503 in which engine running timer $T_{running}$ is started counting up. The logic flow proceeds to step S504 in which a determination is made as to whether or not the counted value of engine running timer $T_{running}$ is not less than threshold value $T_{run\_th}$ indicative of continuation of autonomous rotation of the engine. In a case where in step S504, it is determined that the counted value of engine running timer $T_{running}$ is not less than threshold value $T_{run\_th}$, indicating that stable autonomous rotation of the engine is continued, the logic flow proceeds to step S505 in which engine running flag $F_{running}$ is cleared.

In a case where in step S504, it is determined that the counted value of engine running timer $T_{running}$ is less than threshold value $T_{run\_th}$ the logic flow proceeds to step S506 in which engine running flag $F_{running}$ is set.

In contrast, in a case where in step S501, it is determined that the engine speed value is less than the predetermined speed value, indicating that the engine is not running, the logic flow proceeds to step S507. In step S507, the information as to an engine condition is obtained and a determination is made as to whether or not the engine is in a stopped state thereof. In a case where in step S507, it is determined that the engine is in the stopped state, the logic flow proceeds to step S509 in which cranking flag $F_{cranking}$ is set.

The logic flow then proceeds to step S510 in which engine running timer $T_{running}$ is cleared in order to start the counting up after cranking is ended. The logic flow then proceeds to step S511 in which engine running flag $F_{running}$ is cleared.

In a case where in step S507, it is determined that the engine is not in the stopped state, the logic flow proceeds to step S508. In step S508, the information as to an engine condition is obtained and a determination is made as to whether or not the engine is at cranking. The term "engine is at cranking" means a condition that the engine is being rotated by a self-starting motor. Accordingly, in other words, in step S508, a driving condition of the self-starting motor is read.

In a case where in step S508, it is determined that the engine is at cranking, the logic flow proceeds to step S509. In a case where in step S508, it is determined that the engine is not at cranking, the logic flow is ended.

Figure 9:
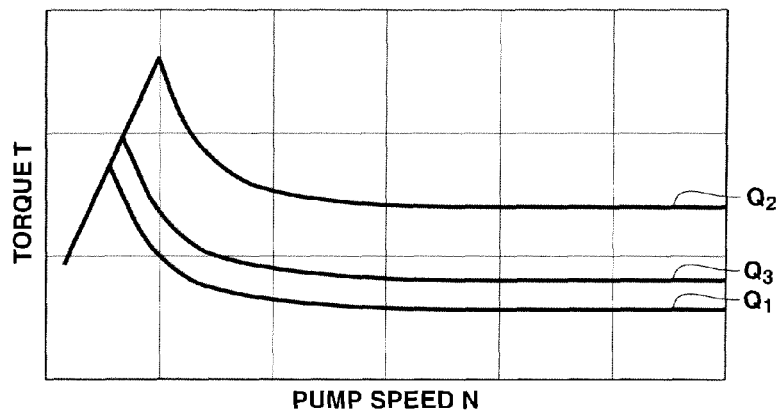
FIG. 9 is a characteristic diagram showing a relationship between pump speed N and torque T required for driving the pump apparatus (equivalent to engine load torque) in the first embodiment of the present invention.

Next, an operation of the pump apparatus according to the first embodiment is explained. FIG. 9 is a characteristic diagram showing a relationship between pump speed N and torque T required for driving the pump apparatus of the first embodiment (equivalent to engine load torque).

Figure 10:
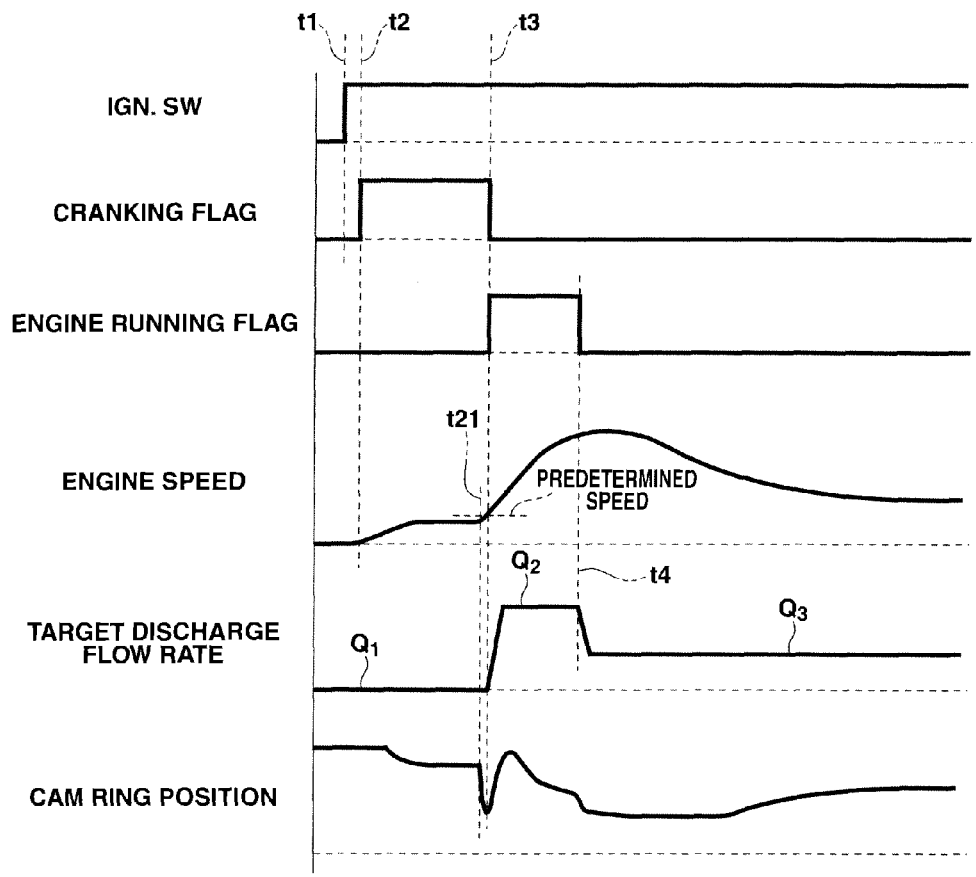
FIG. 10 is a timing chart showing an operation of the pump apparatus according to the first embodiment of the present invention at engine starting.

FIG. 10 is a timing chart showing an operation of the pump apparatus according to the first embodiment which is used in the vehicular steering apparatus, at engine starting.

At time t1, ignition switch 15 is turned on. At time t2, a signal for driving the self-starting motor is outputted and a cranking signal is outputted. Then, engine speed is increased to synchronize rotation speed of the self-starting motor. At this time, cranking flag $F_{cranking}$ is set, while engine running flag $F_{running}$ is held cleared. In this state, the predetermined flow rate 1 is set, that is, the flow rate reduction control is executed. The predetermined flow rate 1 is the minimum discharge flow rate characteristic which can be realized by the pump apparatus, as indicated at $Q_1$ in FIG. 9. In order to attain the predetermined flow rate 1, solenoid 21a is kept in a de-energized state thereof. This operation is equivalent to a first step of the control method according to the first embodiment. As a result, engine load torque is minimized to thereby smoothly carry out cranking.

At time t21, autonomous rotation of the engine is started and the engine speed exceeds a speed produced by cranking. At this time, as the pump discharge flow rate is increased, cam ring 20c is started to move in such a direction as to reduce the eccentric amount.

At time t3 at which the engine speed exceeds a predetermined speed after the autonomous rotation of the engine is started, cranking flag $F_{cranking}$ is cleared. This operation is equivalent to a second step of the control method according to the first embodiment. At this time, engine running flag $F_{running}$ is set, and at the same time, engine running timer $T_{running}$ is started counting up. As a result, the flow rate increase control in which the target discharge flow rate is changed to the predetermined flow rate 2, is executed. The predetermined flow rate 2 is the maximum discharge flow rate characteristic which can be realized by the pump apparatus, as indicated at $Q_2$ in FIG. 9. In order to attain the predetermined flow rate 2, an electric current having a maximum value (about 1.2 A) is allowed to flow through solenoid 21a. This operation is equivalent to a third step of the control method according to the first embodiment.

That is, the flow rate increase control is executed by controlling an amount of electric current flowing through solenoid 21a such that cam ring 20c is displaced in such a direction as to increase the specific discharge quantity. Even in a case where a defect in the projecting motion of vanes 20b occurs, the projecting motion of vanes 20b can be improved by temporarily increasing the discharge flow rate. Further, even in a case where a temperature of the working oil is low, rise in the oil temperature can be facilitated by temporarily increasing the discharge flow rate.

At time t4 at which the counted value of engine running timer $T_{running}$ becomes the threshold value $T_{run\_th}$ or more, engine running flag $F_{running}$ is cleared. A control command for the target discharge flow rate is changed from the predetermined flow rate 2 to target discharge flow rate Q3 which is set under normal control.

The above-described first embodiment can attain the following functions and effects.

(1) The pump apparatus for supplying a working fluid to a steering apparatus for a vehicle, according to the first embodiment, includes pump housing 20d having a pump element accommodating portion 20e, drive shaft 20a1 rotatably supported by pump housing 20d, annular cam ring 20c movably disposed in pump element accommodating portion 20e, a pump element which is disposed within cam ring 20c and rotationally driven by drive shaft 20a1 to suck the working fluid and discharge the working fluid sucked and vary a specific discharge quantity which is a discharge quantity of the working oil per one rotation of the pump element in accordance with variation in eccentric amount of cam ring 20c with respect to drive shaft 20a1, and solenoid 21a which is drivingly controlled on the basis of a steering condition and a vehicle speed, solenoid 21a being operated to control the eccentric amount of cam ring 20c, wherein solenoid 21a is controlled to execute a flow rate reduction control during cranking of an engine of the vehicle in which cam ring 20c is allowed to move in such a direction as to reduce the specific discharge quantity.

That is, by controlling solenoid 21a during cranking of the engine so as to allow cam ring 20c to move in such a direction as to reduce the specific discharge quantity, a pump load during the cranking can be reduced. As a result, it is possible to reduce a load which is applied to a self-starting motor for starting the engine.

(2) In the pump apparatus according to the first embodiment, cam ring 20c is allowed to move in such a direction as to reduce the eccentric amount during the cranking. Since the eccentric movement of cam ring 20c is allowed during the cranking, a pump load can be reduced and thereby a self-starting motor load can be reduced.

(3) In the pump apparatus according to the first embodiment, solenoid 21a is controlled to execute a flow rate increase control after the cranking is ended in which cam ring 20c is allowed to move in such a direction as to increase the specific discharge quantity. Even in a case where a defect in the projecting motion of vanes 20b occurs during the cranking, the projecting motion of vanes 20b can be improved by temporarily increasing the discharge flow rate. Further, even in a case where a temperature of the working oil is low, rise in the oil temperature can be facilitated by temporarily increasing the discharge flow rate.

(4) In the pump apparatus according to the first embodiment, the flow rate increase control is executed by controlling solenoid 21a on the basis of an output signal from engine control unit 13 which controls the engine. It is possible to more appropriately perform control of solenoid 21a by drivingly controlling solenoid 21a on the basis of the output signal from engine control unit 13. For instance, the flow rate increase control to solenoid 21a is surely performed after engine starting is completed, by detecting that the engine starting is completed. As a result, increase in pump load during the cranking can be suppressed to thereby promote reduction of a self-starting motor load.

(5) In the pump apparatus according to the first embodiment, solenoid 21a is controlled to execute the flow rate increase control when a predetermined period of time has elapsed from a time at which the cranking is started. Since the cranking time is generally given, the flow rate increase control after starting of the engine can be readily ensured by executing the flow rate increase control when the predetermined period of time has elapsed from a time at which the cranking is started.

(6) In the pump apparatus according to the first embodiment, solenoid 21a is controlled such that in a case where the rotational speed of drive shaft 20a1 is constant, the specific discharge quantity is minimized when solenoid 21a is in the de-energized state, and the specific discharge quantity is increased as the amount of electric current flowing through solenoid 21a becomes larger. It is possible to suppress the amount of electric current flowing through solenoid 21a under the flow rate reduction control (i.e., the specific discharge quantity reduction control) which is executed during the cranking. Therefore, it is possible to suppress a battery load during the cranking.

(7) In the pump apparatus according to the first embodiment, solenoid 21a is held in the de-energized state during the cranking. It is possible to reduce the specific discharge quantity and reduce a battery load by de-energizing solenoid 21a.

(8) In the pump apparatus according to the first embodiment, solenoid 21a is controlled such that the specific discharge quantity under the flow rate reduction control at the cranking becomes smaller than the specific discharge quantity in a running state of the vehicle and in a non-steering state. It is possible to reduce a pump load during the cranking and enhance a steering response during the vehicle running.

(9) The pump apparatus for supplying a working fluid to a steering apparatus for a vehicle, according to the first embodiment, includes pump housing 20d having a pump element accommodating portion 20e, drive shaft 20a1 rotatably supported by pump housing 20d, cam ring 20c movably disposed in pump element accommodating portion 20e, a pump element which is disposed within cam ring 20c and rotationally driven by drive shaft 20a1 to suck the working fluid and discharge the working fluid sucked and vary a specific discharge quantity which is a discharge quantity of the working fluid per one rotation of the pump element in accordance with variation in eccentric amount of cam ring 20c with respect to drive shaft 20a1, a steering condition detecting means for detecting or calculating a steering angle, a steering angular velocity or a steering angular acceleration and outputting a steering condition detection signal indicative of steering angle θ, steering angular velocity ω or steering angular acceleration dω/dt, solenoid 21a which is operated to control the eccentric amount of cam ring 20c, and control unit 10 configured to determine a solenoid driving signal to drivingly control solenoid 21a in accordance with the steering condition detection signal and a vehicle speed and outputs the solenoid driving signal to solenoid 21a, wherein the control unit is configured to control solenoid 21a so as to allow cam ring 20c to move in such a direction as to reduce the specific discharge quantity during cranking of an engine of the vehicle. With this construction, the same functions and effects as described in the above (1) to (8) can be attained.

(10) In the pump apparatus according to the first embodiment, control unit 10 is further configured to: determine starting of the engine on the basis of an output signal from engine control unit 13 which controls the engine; and control solenoid 21a so as to allow cam ring 20c to move in such a direction as to increase the specific discharge quantity after the engine is started. With this construction, the same functions and effects as described in the above (3) and (4) can be attained.

(11) In the pump apparatus according to the first embodiment, control unit 10 is further configured to: control solenoid 21a so as to allow cam ring 20c to move in such a direction as to increase the specific discharge quantity at a time at which a predetermined period of time has elapsed from starting of the cranking. With this construction, the same functions and effects as described in the above (5) can be attained.

(12) The control method for controlling the pump apparatus to supply a working fluid to a steering apparatus for a vehicle, according to the first embodiment, the pump apparatus including pump housing 20d having a pump element accommodating portion 20e, drive shaft 20a1 rotatably supported by pump housing 20d, cam ring 20c movably disposed in pump element accommodating portion 20e, a pump element disposed within cam ring 20c, the pump element being rotationally driven by drive shaft 20a1 to suck the working fluid and discharge the working fluid sucked and vary a specific discharge quantity which is a discharge quantity of the working fluid per one rotation of the pump element in accordance with variation in eccentric amount of cam ring 20c with respect to drive shaft 20a1, a steering condition detecting means for detecting or calculating a steering angle, a steering angular velocity or a steering angular acceleration and outputting a steering condition detection signal indicative of steering angle θ, steering angular velocity ω or steering angular acceleration dω/dt, solenoid 21a which is operated to control the eccentric amount of cam ring 20c so as to increase as an amount of electric current flowing through solenoid 21a becomes larger, and control unit 10 configured to determine a solenoid driving signal to drivingly control solenoid 21a in accordance with the steering condition detection signal and a vehicle speed and outputs the solenoid driving signal to solenoid 21a, the control method comprising: a first step of detecting a cranking condition of an engine of the vehicle and keeping on outputting the solenoid driving signal to solenoid 21a so as to allow cam ring 20c to move in such a direction as to reduce the eccentric amount during cranking of the engine; a second step of detecting that the cranking condition that the cranking is ended; and a third step of outputting the solenoid driving signal to solenoid 21a so as to allow cam ring 20c to move in such a direction as to increase the eccentric amount after the cranking is ended. This control method can attain the same functions and effects as described in the above (1).

(13) In the control method according to the first embodiment, in the second step, the cranking condition that the cranking is ended is detected on the basis of an output signal from engine control unit 13 which controls the engine. This control method can attain the same functions and effects as described in the above (4).

(14) In the control method according to the first embodiment, in the second step, the cranking condition that the cranking is ended is detected when it is determined that a predetermined period of time has elapsed from starting of the cranking. This control method can attain the same functions and effects as described in the above (5).

Next, a second embodiment of the present invention will be explained by referring to FIG. 11. The second embodiment is basically the same as the first embodiment except for the cranking/starting determination processing. Like reference numerals denote like parts, and therefore, detailed explanations therefore are omitted.

[Cranking/Starting Determination Processing]

Figure 11:
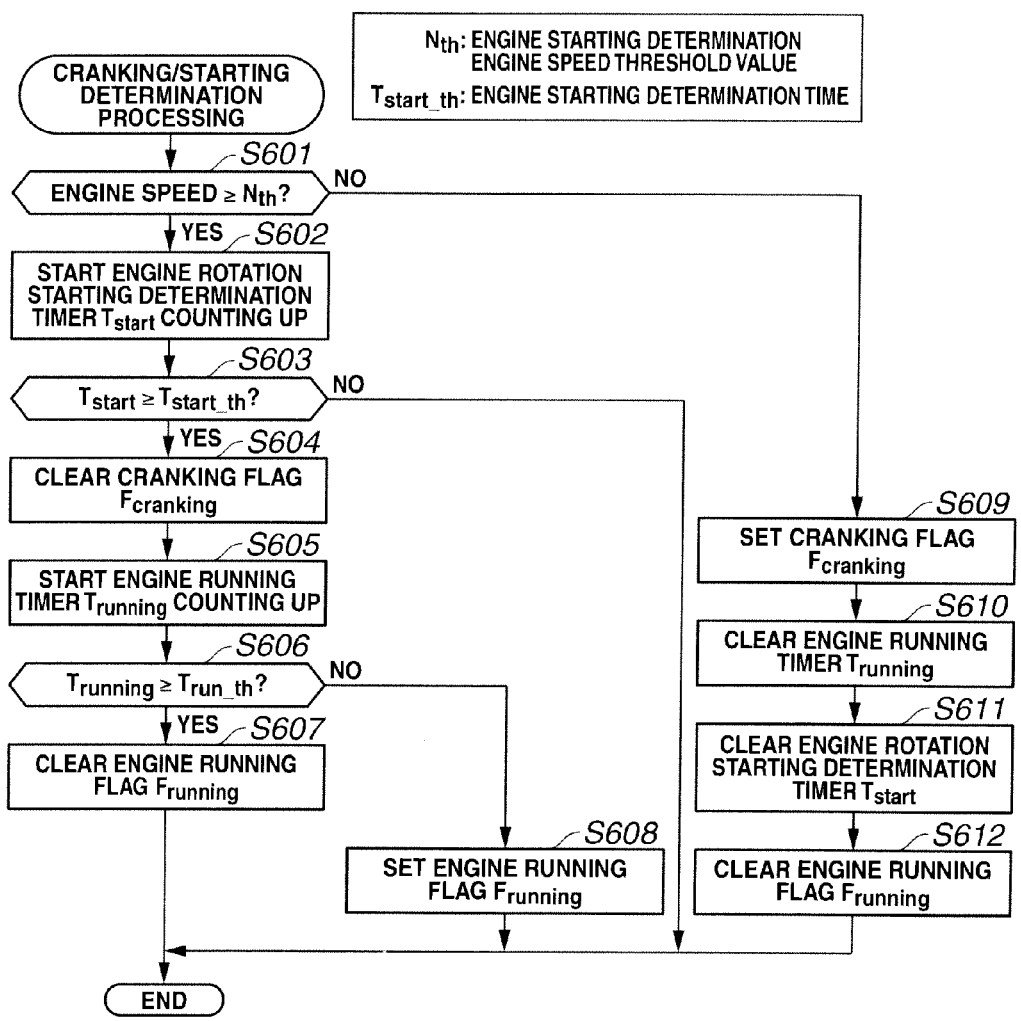
FIG. 11 is a flowchart showing a subroutine of determination of cranking/starting which is executed in a second embodiment of the present invention.

FIG. 11 is a flowchart showing a subroutine of cranking/starting determination according to the second embodiment, which is executed in step S307 as shown in FIG. 7 of the first embodiment.

As shown in FIG. 11, a logic flow of the cranking/starting determination starts and goes to step S601 in which information as to an engine condition is obtained and a determination is made as to whether or not the engine is running. Specifically, in step S601, it is determined whether or not engine speed is not less than predetermined speed value $N_{th}$ which allows autonomous rotation of the engine. That is, the predetermined speed value $N_{th}$ is a threshold value for determination of autonomous rotation of the engine.

In a case where in step S601, it is determined that the engine speed is not less than the predetermined speed value $N_{th}$, indicating that the engine is running, the logic flow proceeds to step S602 in which engine starting determination timer $T_{start}$ is started counting up.

The logic flow then proceeds to step S603 in which a determination is made as to whether or not the counted value of engine starting determination timer $T_{start}$ is not less than engine starting determination time $T_{start\_th}$.

In a case where in step S603, it is determined that the counted value of engine starting determination timer $T_{start}$ is not less than engine starting determination time $T_{start\_th}$, the logic flow proceeds to step S604 in which cranking flag $F_{cranking}$ is cleared. The logic flow then proceeds to step S605 in which engine running timer $T_{running}$ is started counting up. The logic flow then proceeds to step S606 in which a determination is made as to whether or not the counted value of engine running timer $T_{running}$ is not less than threshold value $T_{run\_th}$ indicative of stable autonomous rotation of the engine.

In a case where in step S606, it is determined that the counted value of engine running timer $T_{running}$ is not less than threshold value $T_{run\_th}$, indicating that autonomous rotation of the engine is stable, the logic flow proceeds to step S607 in which engine running flag $F_{running}$ is cleared.

In contrast, in a case where in step S601, it is determined that the engine speed is less than the predetermined speed value $N_{th}$, indicating that the engine is not running, the logic flow proceeds to step S609 in which cranking flag $F_{cranking}$ is set. The logic flow then proceeds to step S610 in which engine running timer $T_{running}$ is cleared in order to start the counting up after cranking is ended. The logic flow then proceeds to step S611 in which engine starting determination timer $T_{start}$ is cleared. The logic flow then proceeds to step S612 in which engine running flag $F_{running}$ is cleared.

In a case where in step S603, it is determined that the counted value of engine starting determination timer $T_{start}$ is less than engine starting determination time $T_{start\_th}$, steps S601 to S603 are repeated until it is determined that the counted value of engine starting determination timer $T_{start}$ is not less than engine starting determination time $T_{start\_th}$.

In a case where in step S606, it is determined that the counted value of engine running timer $T_{running}$ is less than threshold value $T_{run\_th}$, the logic flow proceeds to step S608 in which engine running flag $F_{running}$ is set.

In the first embodiment, in a case where engine speed is not less than the predetermined speed value, the target discharge flow rate is changed from $Q_1$ to $Q_2$. In contrast, in the second embodiment, in a case where engine speed is not less than the predetermined speed value $N_{th}$ and the predetermined time $T_{start\_th}$ for determining that engine starting is surely carried out and the autonomous rotation of the engine is started, has elapsed, the target discharge flow rate is changed from $Q_1$ to $Q_2$. With the construction of the second embodiment, it is possible to reduce a pump load at the engine starting and further enhance startability of the engine.

A third embodiment of the present invention will be explained by referring to FIG. 12. The third embodiment is basically the same as the first embodiment except for the cranking/starting determination processing.

[Cranking/Starting Determination Processing]

Figure 12:
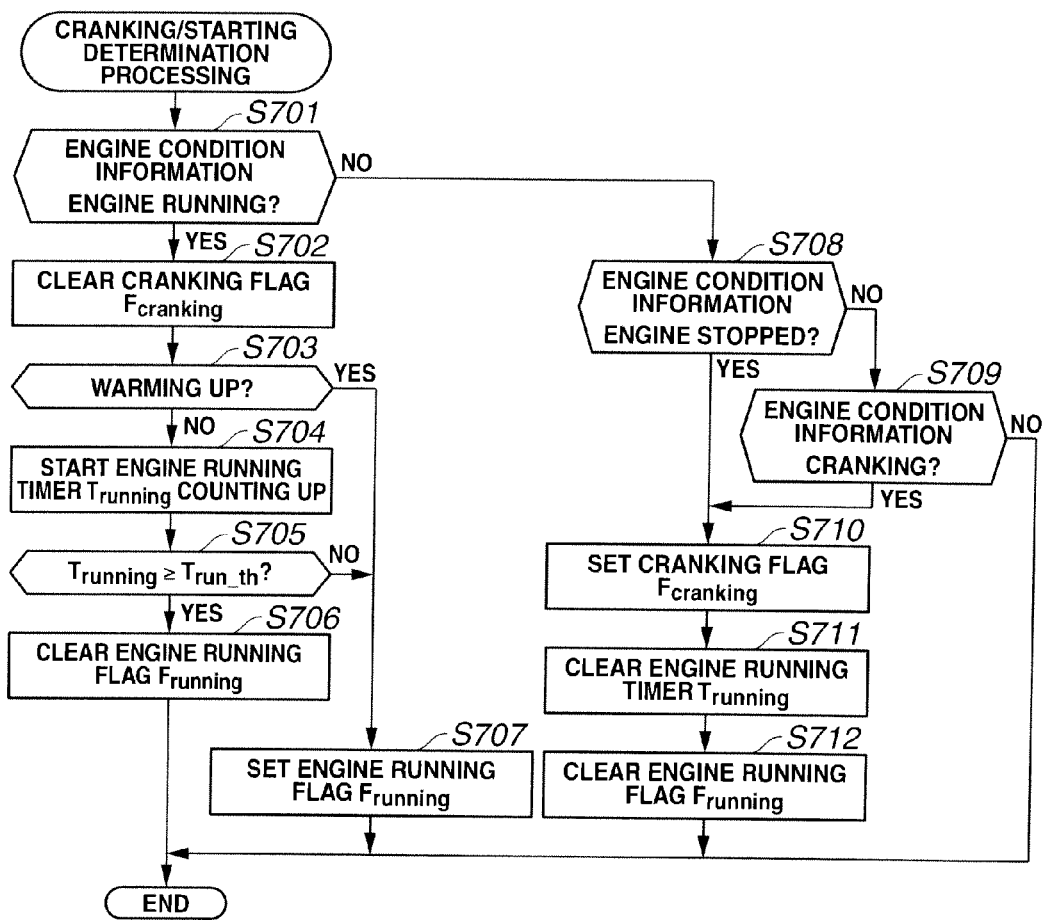
FIG. 12 is a flowchart showing a subroutine of determination of cranking/starting which is executed in a third embodiment of the present invention.

FIG. 12 is a flowchart showing a subroutine of cranking/starting determination according to the third embodiment, which is executed in step S307 as shown in FIG. 7 of the first embodiment. Steps S701 to S702 as shown in FIG. 12 are the same as steps S501 to S502 as shown in FIG. 8 of the first embodiment. Steps S704 to S712 as shown in FIG. 12 are the same as steps S503 to S511 as shown in FIG. 8 of the first embodiment. The subroutine of cranking/starting determination according to the third embodiment differs from that of the first embodiment in provision of step S703.

After in step S702, cranking flag $F_{cranking}$ is cleared, the logic flow proceeds to step S703 in which a determination is made as to whether or not the engine is warming up. In a case where in step S703, it is determined that the engine is warming up, the logic flow proceeds to step S707 in which engine running flag $F_{running}$ is set. In contrast, in a case where in step S703, it is determined that the engine is not warming up, the logic flow proceeds to step S704 in which engine running timer $T_{running}$ is started counting up.

The term "warming up" means an operation of increasing the engine speed to a speed value which is larger by a predetermined speed value than an idling speed under a condition that a temperature of an engine cooling water is low to thereby cause a friction loss in the engine which is too large to allow the autonomous rotation of the engine. In general, in a case where a vehicle is allowed to stand for a long period of time, a temperature of the engine is reduced. In addition, in a case where an outside air temperature is low, engine friction tends to become high. In such a case, engine control unit 13 increases the idling speed in order to overcome the engine friction. Also, in such a case, a temperature of working oil for operating a power steering apparatus is low and viscous drag of the working fluid tends to become strong to thereby generate a feeling of an abnormal condition. In order to solve such a problem, in the third embodiment, in a case where the engine is under the warming up condition, the flow rate increase control is executed to thereby more widely circulate the working oil so that a rise in the oil temperature can be facilitated.

As explained above, the third embodiment can attain the following function and effect (15) in addition to those of the first embodiment.

(15) In the pump apparatus according to the third embodiment, the flow rate increase control is executed under a warming up condition of the engine. There is a high possibility that an oil temperature in the power steering apparatus is low under the warming up condition of the engine. In such a condition, rise in the oil temperature can be facilitated by executing the flow rate increase control.

Next, a fourth embodiment of the present invention will be explained by referring to FIG. 13. The fourth embodiment is basically the same as the third embodiment except for the cranking/starting determination processing.

[Cranking/Starting Determination Processing]

Figure 13:
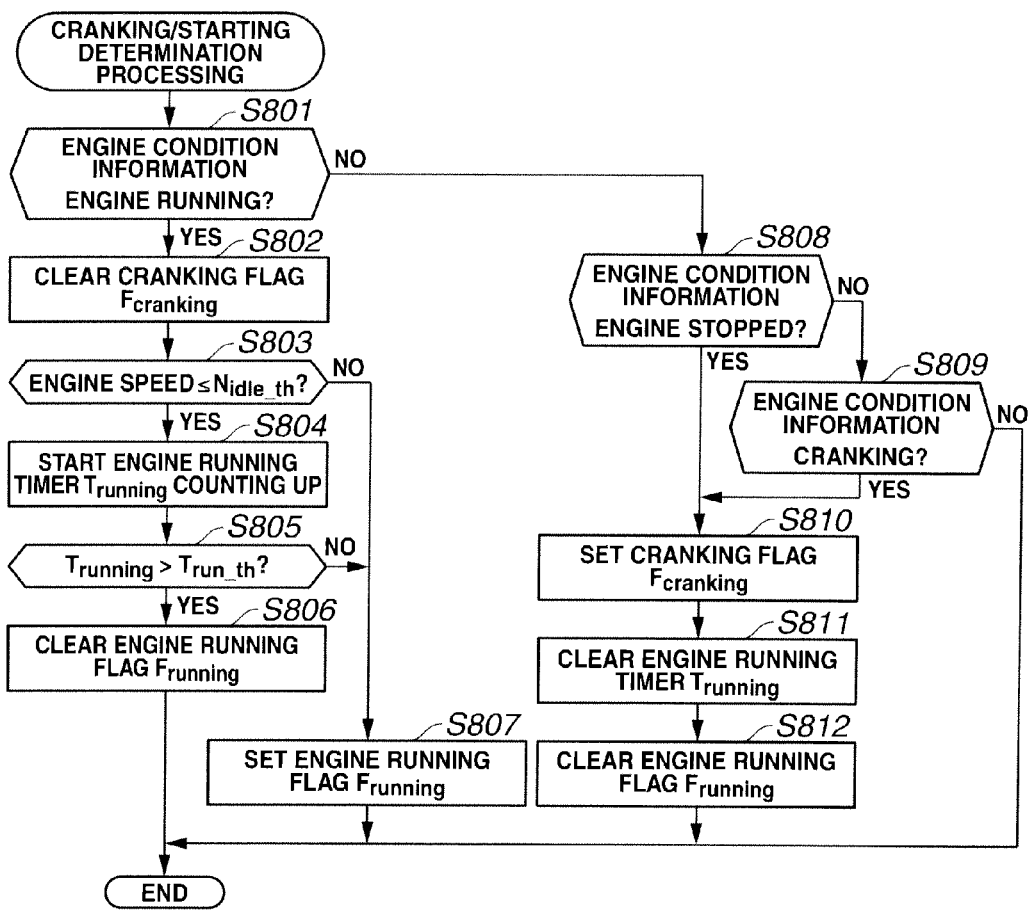
FIG. 13 is a flowchart showing a subroutine of determination of cranking/starting which is executed in a fourth embodiment of the present invention.

FIG. 13 is a flowchart showing a subroutine of cranking/starting determination according to the fourth embodiment, which is executed in step S307 as shown in FIG. 7 of the first embodiment. Steps S801 to S802 as shown in FIG. 13 are the same as steps S701 to S702 as shown in FIG. 12 of the third embodiment. Steps S804 to S812 as shown in FIG. 13 are the same as steps S704 to S712 as shown in FIG. 12 of the third embodiment. Step S803 as shown in FIG. 13 differs from step 703 as shown in FIG. 12 of the third embodiment.

In the third embodiment, in step S703, it is determined whether or not the engine is under the warming up condition on the basis of the information from engine control unit 13. In contrast, in the fourth embodiment, in step S803, a determination is made as to whether or not an engine speed value is not more than predetermined speed value $N_{idle\_th}$ which denotes an idling speed. In a case where in step S803, it is determined that the engine speed value is more than predetermined speed value $N_{idle\_th}$, indicating that an idle up operation is carried out with a warming up operation, the logic flow proceeds to step S807. In step S807, engine running flag $F_{running}$ is set to thereby set the predetermined flow rate 2 and execute the flow rate increase control.

On the other hand, in a case where in step S803, it is determined that the engine speed value is not more than predetermined speed value $N_{idle\_th}$, indicating that the idle up operation is not carried out, the logic flow proceeds to step S804 and the subsequent steps. When a predetermined condition is fulfilled, the target discharge flow rate is changed from the predetermined flow rate 2 to the target discharge flow rate which is set under normal control.

As explained above, in the fourth embodiment, the warming up condition of the engine is determined on the basis of the engine speed value, whereby the fourth embodiment can attain the same functions and effects of those of the third embodiment.

Next, a fifth embodiment of the present invention will be explained by referring to FIG. 14. The fifth embodiment is basically the same as the first embodiment except for the cranking/starting determination processing.

[Cranking/Starting Determination Processing]

Figure 14:
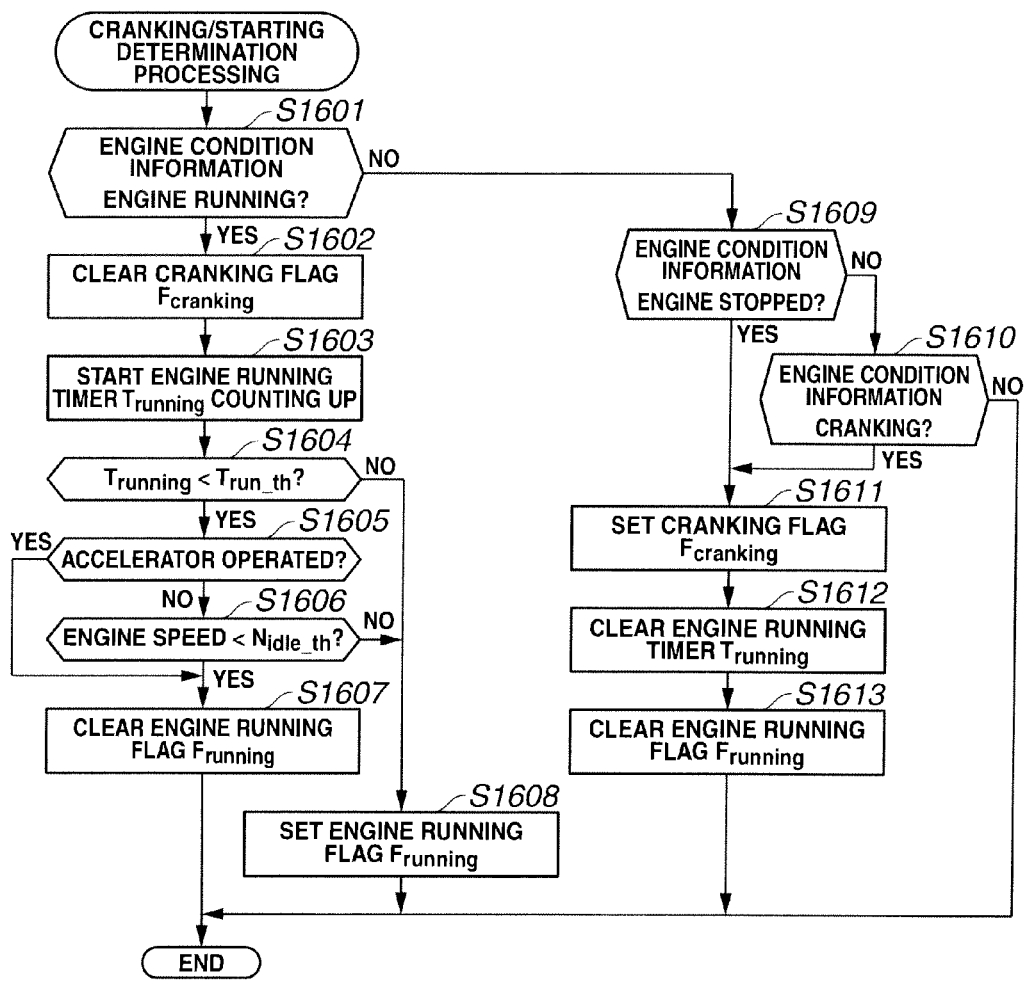
FIG. 14 is a flowchart showing a subroutine of determination of cranking/starting which is executed in a fifth embodiment of the present invention.

FIG. 14 is a flowchart showing a subroutine of cranking/starting determination according to the fifth embodiment, which is executed in step S307 as shown in FIG. 7 of the first embodiment. Steps S1601 to S1603 as shown in FIG. 14 are the same as steps S501 to S503 as shown in FIG. 8 of the first embodiment. Steps S1607 to S1613 as shown in FIG. 14 are the same as steps S505 to S511 as shown in FIG. 8 of the first embodiment. The subroutine of cranking/starting determination according to the fifth embodiment differs in step S1604, step S1605 and step S1606 from the subroutine of cranking/starting determination of the first embodiment.

In the first embodiment, the predetermined flow rate 2 is set on the basis of the counted value of engine running timer $T_{running}$. That is, in the first embodiment, a period of time for executing the flow rate increase control is set as predetermined value $T_{run\_th}$. In contrast, in the fifth embodiment, in a case where the accelerator pedal is operated by the vehicle driver even under a condition that the counted value of engine running timer $T_{running}$ is less than predetermined value $T_{run\_th}$, engine running flag $F_{running}$ is cleared and the normal control is carried out without executing the flow rate increase control. Further, in a case where an engine speed value is not more than a predetermined speed value indicating that the engine is under the warming up condition, even under a condition that the accelerator pedal is not operated by the vehicle driver, it is determined that the engine is not under the warming up condition and the oil temperature in the power steering apparatus is not low, and the flow rate increase control is not executed.

As shown in FIG. 14, after in step S1603, engine running timer $T_{running}$ is started counting up, the logic flow proceeds to step S1604 in which a determination is made as to whether or not the counted value of engine running timer $T_{running}$ is less than threshold value $T_{run\_th}$ indicative of continuation of autonomous rotation of the engine. In a case where in step S1604, it is determined that the counted value of engine running timer $T_{running}$ is less than predetermined value $T_{run\_th}$, the logic flow proceeds to step S1605.

In step S1605, a determination is made as to whether or not the accelerator pedal is operated by the vehicle driver. In a case where in step S1605, it is determined that the accelerator pedal is operated, it is understood that the engine speed begins to then increase to thereby attain an increase in discharge quantity without executing the flow rate increase control. In this case, the logic flow proceeds to step S1607 in which engine running flag $F_{running}$ is cleared.

In a case where in step S1604, it is determined that the counted value of engine running timer $T_{running}$ is not less than threshold value $T_{run\_th}$, the logic flow proceeds to step S1608 in which engine running flag $F_{running}$ is set.

In a case where in step S1605, it is determined that the accelerator pedal is not operated, the logic flow proceeds to step S1606 in which a determination is made as to whether or not an engine speed value is less than predetermined speed value $N_{idle\_th}$.

In a case where in step S1606, it is determined that the engine speed value is less than predetermined speed value $N_{idle\_th}$, indicating that the engine is not under the warming up condition, the logic flow proceeds to step S1607.

In a case where in step S1606, it is determined that the engine speed value is not less than predetermined speed value $N_{idle\_th}$, indicating that the engine is under the warming up condition, the logic flow proceeds to step S1608.

As explained above, the fifth embodiment can attain the following function and effect (16) in addition to those of the first embodiment.

(16) In the pump apparatus according to the fifth embodiment, in a case where an accelerator pedal is not operated and an engine speed value is not less than predetermined speed value $N_{idle\_th}$, it is determined that the engine is under the warming up condition, and solenoid 21a is controlled to execute the flow rate increase control. By detecting the warming up condition on the basis of an amount of the accelerator pedal operation and an engine speed value, it is possible to readily determine the warming up condition of the engine.

Figure 15:
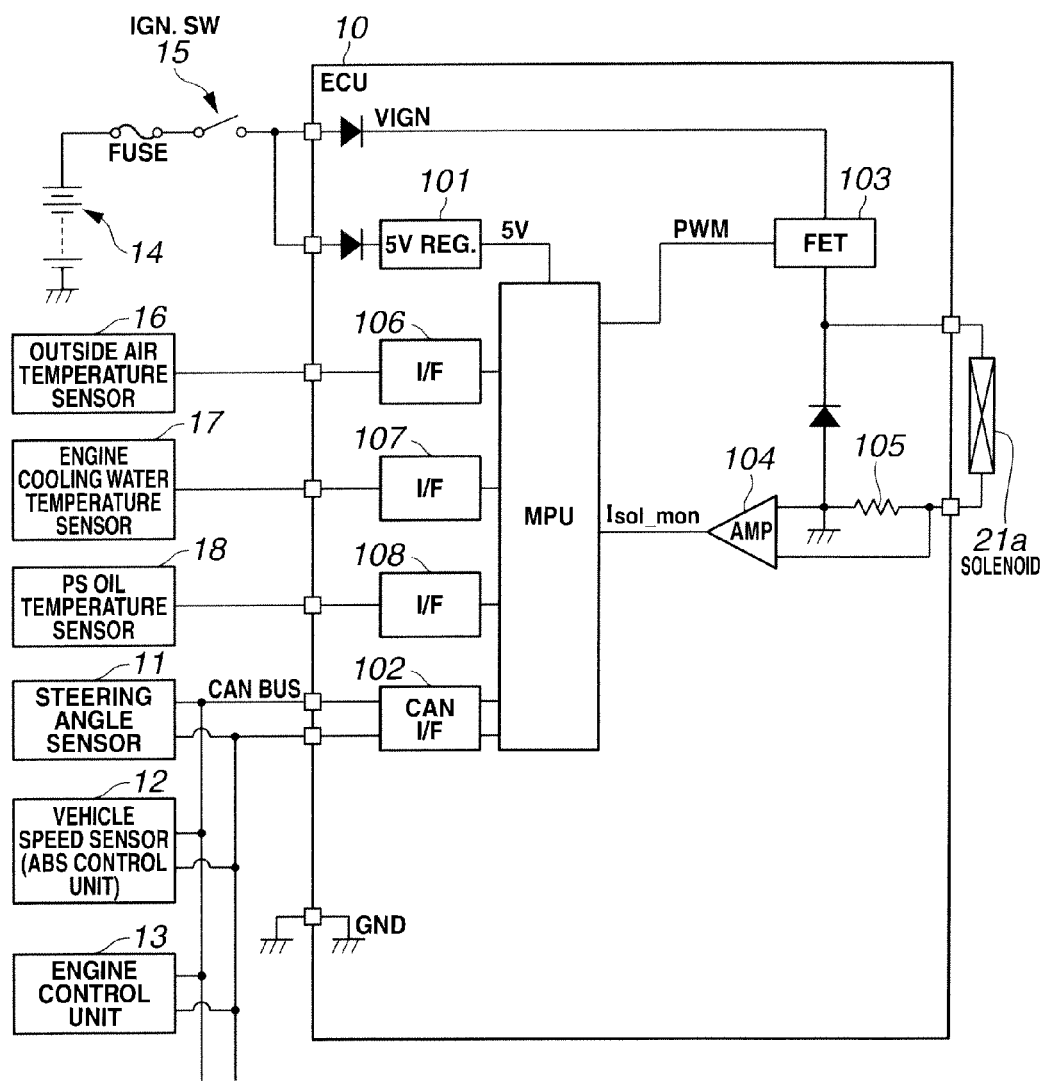
FIG. 15 is a block diagram showing a control system of the vehicular steering apparatus to which the pump apparatus and the control method therefore according to a sixth embodiment of the present invention is applied.

Next, a sixth embodiment of the present invention will be explained by referring to FIG. 15 and FIG. 16. FIG. 15 is a block diagram showing a control system of the vehicular steering apparatus, according to the sixth embodiment. The sixth embodiment is basically the same as the first embodiment except for additional three sensors which transmit signals to be directly inputted to control unit 10 without flowing through CAN line CAN BUS, and the below-described cranking/starting determination processing.

Outside air temperature sensor 16 detects a temperature of outside air of the vehicle and transmits a signal to microcomputer MPU via interface 106 within control unit 10. Engine cooling water sensor 17 detects a temperature of an engine cooling water and transmits a signal to microcomputer MPU via interface 107 within control unit 10. Power steering oil temperature sensor detects a temperature of an oil temperature in the power steering apparatus and transmits a signal to microcomputer MPU via interface 108 within control unit 10. These sensor signals are directly inputted to control unit 10 in this embodiment, but may be detected in any other controller and indirectly inputted to control unit 10 via CAN line CAN BUS.

[Cranking/Starting Determination Processing]

Figure 16:
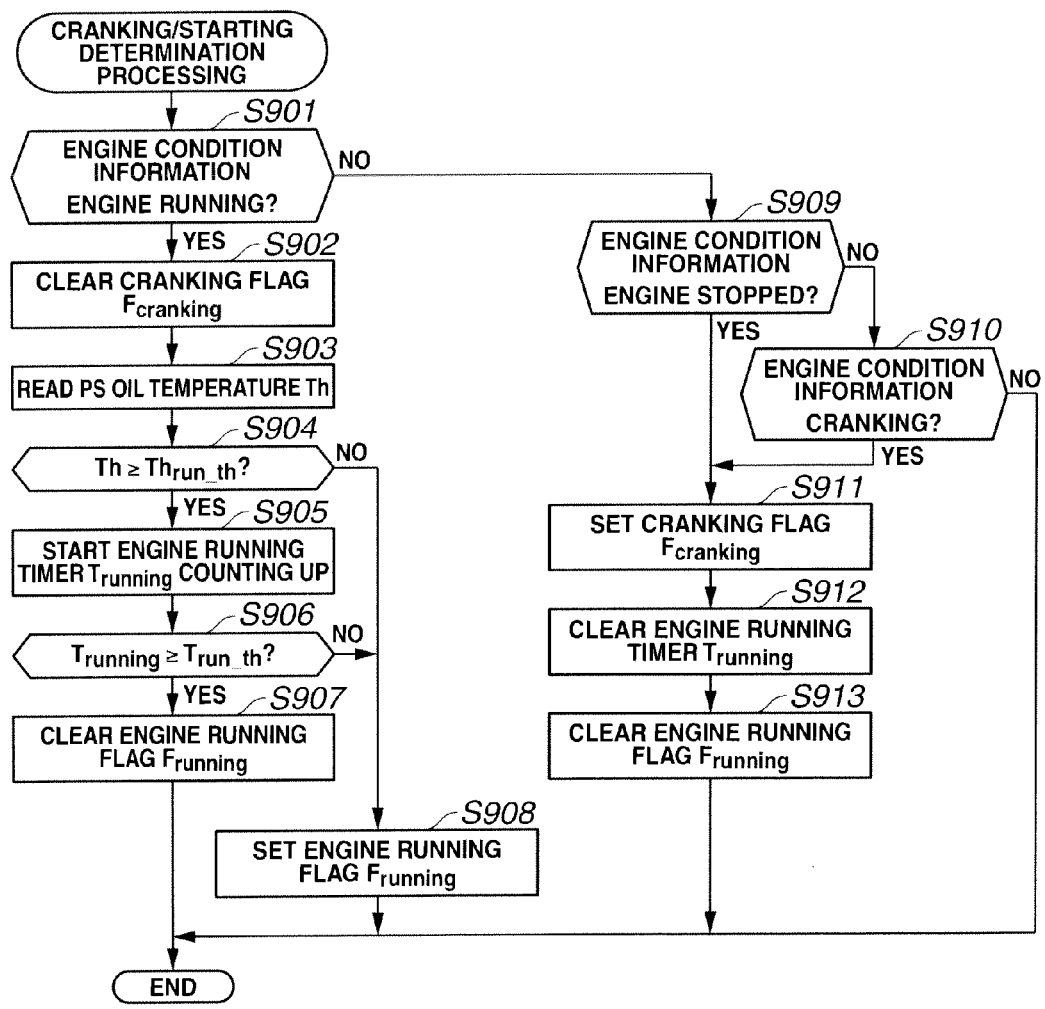
FIG. 16 is a flowchart showing a subroutine of determination of cranking/starting which is executed in the sixth embodiment of the present invention.

FIG. 16 is a flowchart showing a subroutine of cranking/starting determination according to the sixth embodiment, which is executed in step S307 as shown in FIG. 7 of the first embodiment. Steps S901 to S902 as shown in FIG. 16 are the same as steps S501 to S502 as shown in FIG. 8 of the first embodiment. Steps S905 to S913 as shown in FIG. 16 are the same as steps S503 to S511 as shown in FIG. 8. The subroutine of cranking/starting determination according to the sixth embodiment differs from that of the first embodiment in provision of step S903 and step S904.

As shown in FIG. 16, after in step S902, cranking flag $F_{cranking}$ is cleared, the logic flow proceeds to step S903 in which oil temperature value Th of the working oil in the power steering apparatus is read. The logic flow then proceeds to step S904 in which a determination is made as to whether or not oil temperature value Th is not less than predetermined oil temperature value $Th_{run\_th}$ which denotes a low oil temperature.

In a case where in step S904, it is determined that oil temperature value Th is not less than predetermined oil temperature value $Th_{run\_th}$, the logic flow proceeds to step S905 in which engine running timer $T_{running}$ is started counting up.

In a case where in step S904, it is determined that oil temperature value Th is less than predetermined oil temperature value $Th_{run\_th}$, the logic flow proceeds to step S908 in which engine running flag $F_{running}$ is set. The target discharge flow rate is set to the predetermined flow rate 2 and the flow rate increase control is executed in order to efficiently raise the oil temperature.

Oil temperature value Th of the working oil in the power steering apparatus is detected in this embodiment, but may be determined using one of an engine cooling water temperature and an outside air temperature or a combination thereof.

As explained above, the sixth embodiment can attain the following functions and effects (17) and (18) in addition to those of the first embodiment.

(17) In the pump apparatus according to the sixth embodiment, in a case where it is determined that the engine is under the warming up condition on the basis of an output signal from a temperature sensor which detects an engine cooling water temperature or an oil temperature of the working oil in the power steering apparatus, solenoid 21a is controlled to execute the flow rate increase control. By detecting the warming up condition on the basis of the output signal from the temperature sensor, it is possible to determine the warming up condition with high accuracy.

(18) In the pump apparatus according to the sixth embodiment, solenoid 21a can be controlled such that as an engine cooling water temperature, an engine oil temperature or an oil temperature of the working oil in the power steering apparatus becomes lower, a period of time over which the flow rate increase control is executed is increased. Specifically, an engine cooling water temperature value, an engine oil temperature value or an oil temperature value of the working oil in the power steering apparatus is read, and as the temperature value read becomes lower, the threshold value $Th_{run\_th}$ indicative of a stable rotation of the engine is set to a larger value. By thus increasing the period of time over which the flow rate increase control is executed, as the temperature value read becomes lower, it is possible to attain an enhanced effect of increasing the oil temperature which is produced by the increased flow rate, under a low temperature condition.

Next, a seventh embodiment of the present invention will be explained by referring to FIG. 17. The seventh embodiment is basically the same as the first embodiment except for the cranking/starting determination processing.

[Cranking/Starting Determination Processing]

Figure 17:
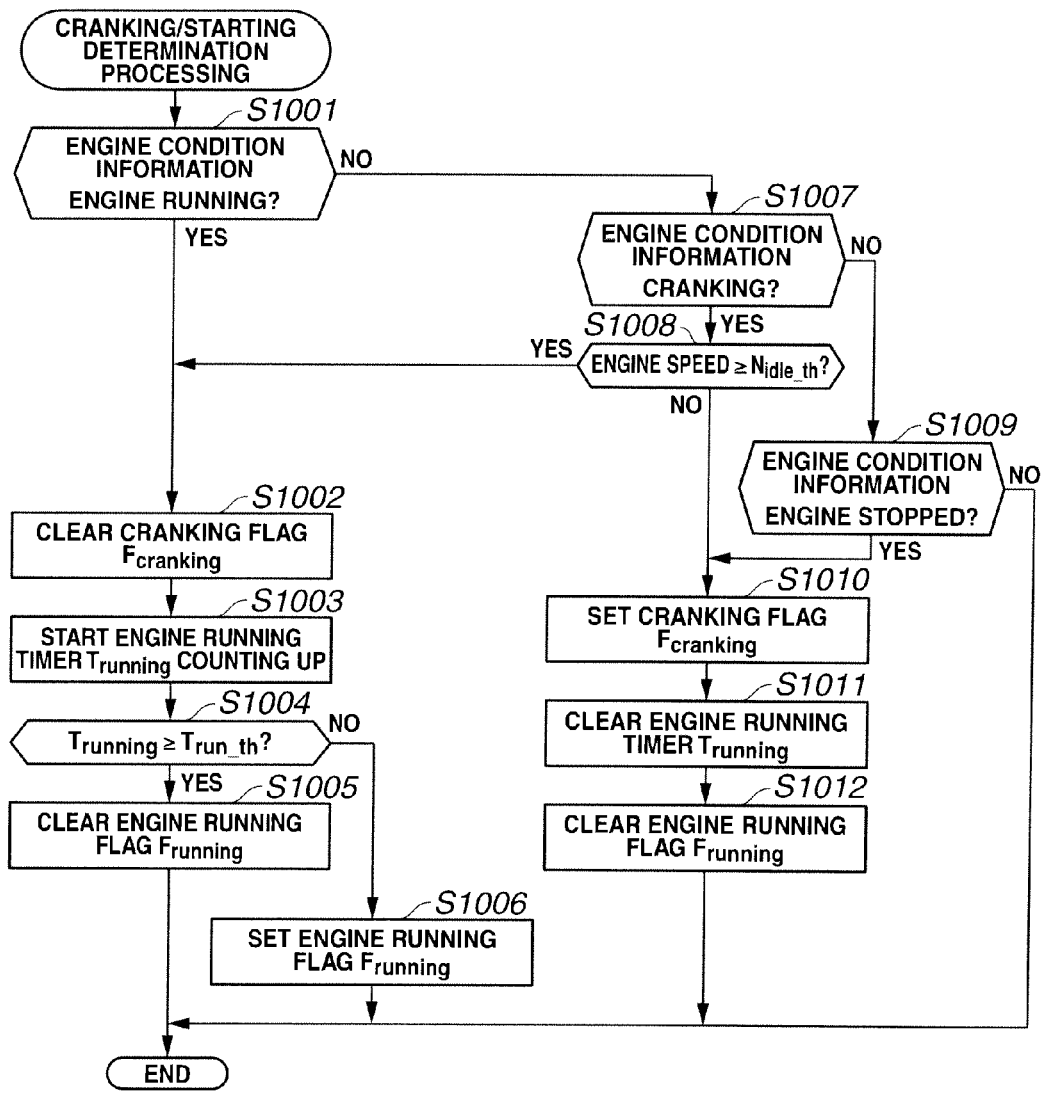
FIG. 17 is a flowchart showing a subroutine of determination of cranking/starting which is executed in a seventh embodiment of the present invention.

FIG. 17 is a flowchart showing a subroutine of determination of cranking/starting according to the seventh embodiment of the present invention. Steps S1001 to S1006 as shown in FIG. 17 are the same as steps S501 to S506 as shown in FIG. 8 of the first embodiment. Steps S1010 to S1012 as shown in FIG. 17 are the same as steps S509 to S511 as shown in FIG. 8 of the first embodiment. The subroutine of determination of cranking/starting according to the seventh embodiment differs from that of the first embodiment in steps S1007 to S1009.

As shown in FIG. 17, in a case where in step S1001, it is determined that the engine is not running, the logic flow proceeds to step S1007 in which the information as to an engine condition is read and a determination is made as to whether or not the engine is at cranking.

In a case where in step S1007, it is determined that the engine is at cranking, the logic flow proceeds to step S1008 in which a determination is made as to whether or not an engine speed value is not less than predetermined speed value $N_{idle\_th}$. In a case where in step S1008, it is determined that the engine speed value is not less than predetermined speed value $N_{idle\_th}$, indicating that the cranking is ended, the logic flow proceeds to step S1002 in which cranking flag $F_{cranking}$ is cleared.

In a case where in step S1007, it is determined that the engine is not at cranking, the logic flow proceeds to step S1009. In step S1009, the information as to an engine condition is read and a determination is made as to whether or not the engine is in a stopped state. In a case where in step S1009, it is determined that the engine is in a stopped state, the logic flow proceeds to step S1010 in which cranking flag $F_{cranking}$ is set.

In a case where in step S1008, it is determined that the engine speed value is less than predetermined speed value $N_{idle\_th}$, indicating that the cranking is continued, the logic flow proceeds to step S1010. The logic flow then proceeds to step S1011 in which engine running timer $T_{running}$ is cleared. The logic flow then proceeds to step S1012 in which engine running flag $F_{running}$ is cleared.

In a case where in step S1009, it is determined that the engine is not in a stopped state, and therefore, the autonomous rotation of the engine has been started, the logic flow is ended.

For instance, a vehicle having an idle stop control function executes an idle stop control to stop idling of the engine while waiting at a traffic light with the ignition key in the ON position. Generally, when such a condition as to instantaneously carry out restart of the engine is fulfilled, the vehicle conducts the idle stop control. In such a case, when an engine restart command is outputted and a self-starting motor is actuated, the engine starts the autonomous rotation more quickly than at a normal start of the engine. In a case where the control system according to the seventh embodiment is applied to the vehicle having an idle stop control function, when the engine speed value is increased to not less than predetermined speed value $N_{idle\_th}$ even during cranking, cranking flag $F_{cranking}$ is instantaneously cleared and engine running timer $T_{running}$ is started counting up. As a result, an optimal control of the pump apparatus can be performed.

Next, an eighth embodiment of the present invention will be explained by referring to FIG. 18 and FIG. 19. The eighth embodiment is basically the same as the first embodiment except for the cranking/starting determination processing.

[Cranking/Starting Determination Processing]

Figure 18:
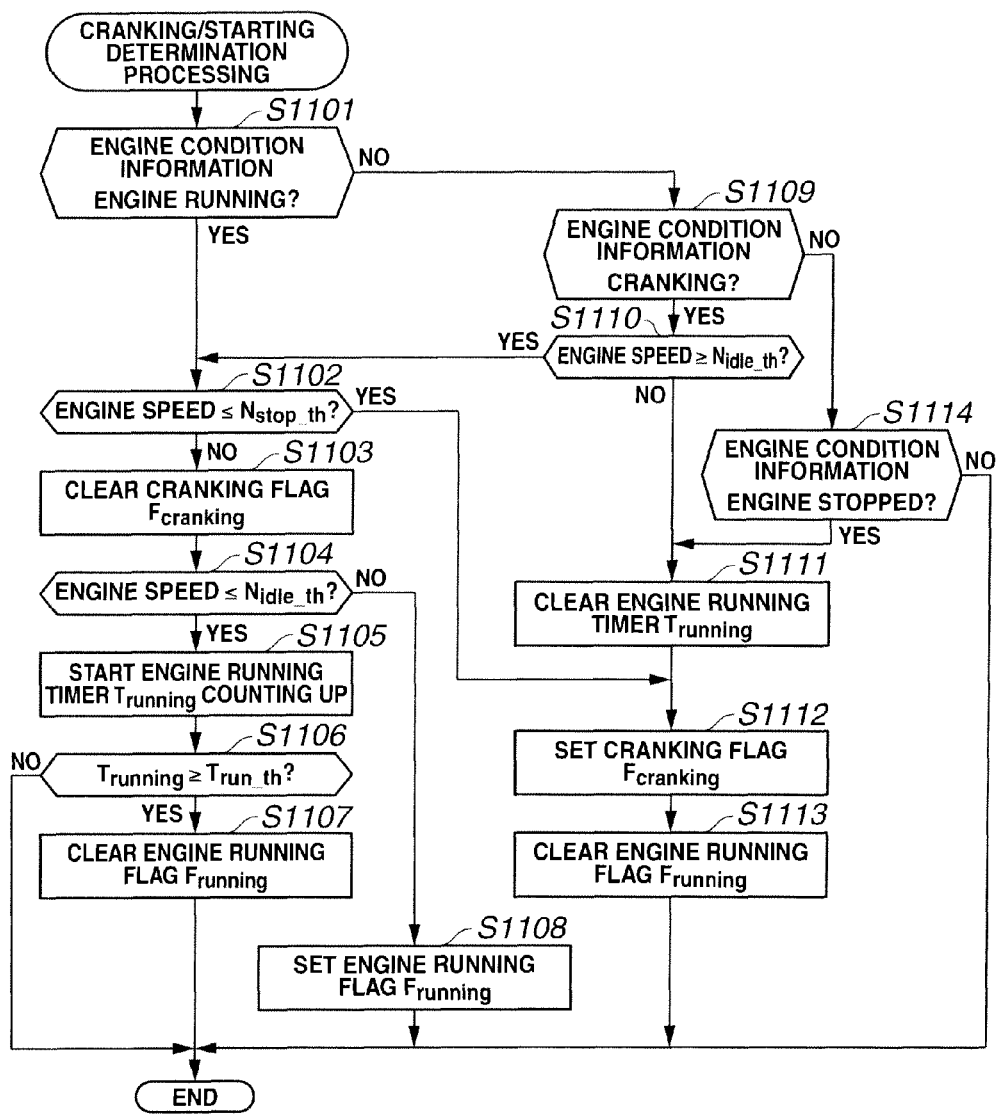
FIG. 18 is a flowchart showing a subroutine of determination of cranking/starting according to an eighth embodiment of the present invention.
Figure 19:
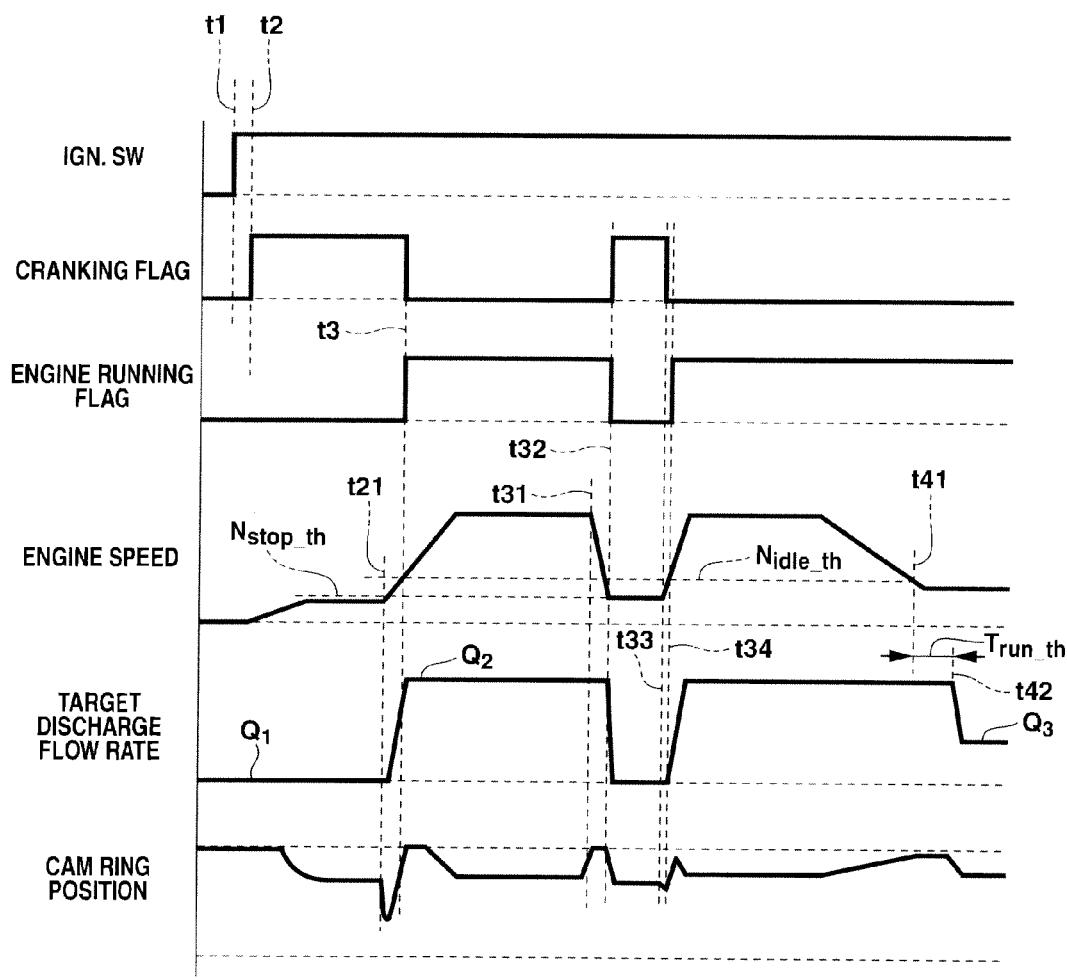
FIG. 19 is a timing chart showing an operation of the pump apparatus according to the eighth embodiment of the present invention upon executing the subroutine of determination of cranking/starting.

FIG. 18 is a flowchart showing a subroutine of determination of cranking/starting which is executed in the eighth embodiment of the present invention.

As shown in FIG. 18, a logic flow starts and goes to step S1101 in which the information as to an engine condition is read and a determination is made as to whether or not the engine is running. In a case where in step S1101, it is determined that the engine is running, the logic flow proceeds to step S1102 in which a determination is made as to whether or not the engine speed value is not more than predetermined speed value $N_{stop\_th}$ at which engine stall may occur.

In a case where in step S1102, it is determined that the engine speed value is not more than predetermined speed value $N_{stop\_th}$, the logic flow proceeds to step S1112 in which cranking flag $F_{cranking}$ is set. The logic flow then proceeds to step S1113 in which engine running flag $F_{running}$ is cleared.

In a case where in step S1101, it is determined that the engine is not running, the logic flow proceeds to step S1109. In step S1109, the information as to an engine condition is read and a determination is made as to whether or not the engine is at cranking.

In a case where in step S1109, it is determined that the engine is at cranking, the logic flow proceeds to step S1110 in which a determination is made as to whether or not an engine speed value is not less than predetermined speed value $N_{idle\_th}$.

In a case where in step S1110, it is determined that the engine speed value is not less than predetermined speed value $N_{idle\_th}$, the logic flow proceeds to step S1102.

In a case where in step S1102, it is determined that the engine speed value is more than predetermined speed value $N_{stop\_th}$ the logic flow proceeds to step S1103 in which cranking flag $F_{cranking}$ is cleared.

The logic flow then proceeds to step S1104 in which a determination is made as to whether or not the engine speed value is not more than predetermined speed value $N_{idel\_th}$ which denotes autonomous rotation of the engine.

In a case where in step S1104, it is determined that the engine speed value is not more than predetermined speed value $N_{idel\_th}$, the logic flow proceeds to step S1105 in which engine running timer $T_{running}$ is started counting up.

The logic flow then proceeds to step S1106 in which a determination is made as to whether or not the counted value of engine running timer $T_{running}$ is not less than predetermined value $T_{run\_th}$.

In a case where in step S1106, it is determined that the counted value of engine running timer $T_{running}$ is not less than predetermined value $T_{run\_th}$, the logic flow proceeds to step S1107 in which engine running flag $F_{running}$ is cleared.

In a case where in step S1104, it is determined that the engine speed value is more than predetermined speed value $N_{idel\_th}$, the logic flow proceeds to step S1108 in which engine running flag $F_{running}$ is set.

In a case where in step S1106, it is determined that the counted value of engine running timer $T_{running}$ is less than predetermined value $T_{run\_th}$, the logic flow is repeated.

In a case where in step S1109, it is determined that the engine is not at cranking, the logic flow proceeds to step S1114. In step S1114, the information as to an engine condition is read and a determination is made as to whether or not the engine is in a stopped state.

In a case where in step S1114, it is determined that the engine is in a stopped state, the logic flow proceeds to step S1111 in which engine running timer $T_{running}$ is cleared. The logic flow then proceeds to steps S1112 and S1113.

In a case where in step S1110, it is determined that the engine speed value is less than predetermined speed value $N_{idle\_th}$, the logic flow proceeds to steps S1111, S1112 and S1113.

In a case where in step S1114, it is determined that the engine is not in a stopped state, that is, the engine is running, the logic flow is repeated.

Next, an operation of the pump apparatus according to the eighth embodiment is explained. FIG. 19 is a timing chart upon executing the subroutine of determination of cranking/starting according to the eighth embodiment. The operation of the pump apparatus according to the eighth embodiment during the period of time from time t1 to time t3 is the same as that of the first embodiment, and therefore, the operation thereof after time t3 is explained.

At time t31, the engine speed begins to be reduced by any reason such as occurrence of an expected larger load, lack of combustion or the like, even after the engine is started. A discharge pressure of the pump apparatus is also lowered and an eccentric amount of cam ring 20c is increased, thereby causing increase in engine driving load.

At time t32 at which the engine speed value becomes predetermined speed value $N_{stop\_th}$ or less, cranking flag $F_{cranking}$ is set and engine running flag $F_{running}$ is cleared. As a result, the target discharge flow rate is changed from the predetermined flow rate 2 ($Q_2$) to the predetermined flow rate 1 ($Q_1$) and the eccentric amount of cam ring 20c is decreased, so that an engine load can be reduced.

At time t33 at which the engine speed becomes larger than $N_{stop\_th}$, cranking flag $F_{cranking}$ is cleared. At time t34 immediately after time 33 at which the engine speed exceeds predetermined speed value $N_{idle\_th}$ indicative of the autonomous rotation of the engine, engine running flag $F_{running}$ is set. As a result, the target discharge flow rate is changed again from the predetermined flow rate 1 ($Q_1$) to the predetermined flow rate 2 ($Q_2$).

When the engine condition is transferred from idle up to warming up and then meets with a predetermined condition, the engine speed value begins to be gradually reduced. At time t41 at which the engine speed value becomes lower than predetermined speed value $N_{idle\_th}$, engine running timer $T_{running}$ is started counting up.

At time t42 at which the counted value of engine running timer $T_{running}$ reaches predetermined value $T_{run\_th}$, engine running flag $F_{running}$ is cleared and the target discharge flow rate is set to target discharge flow rate Q3 which is set under normal control.

As explained above, the eighth embodiment can attain the following function and effect (19).

(19) In the pump apparatus according to the eighth embodiment, in a case where the engine is started and the engine speed value becomes predetermined speed value $N_{stop\_th}$ or less, solenoid 21a is controlled to execute the flow rate reduction control. A possibility of occurrence of engine stall is determined using the engine speed, and in a case where the possibility of occurrence of engine stall is determined, the specific discharge quantity is reduced. As a result, a pump load can be reduced to thereby suppress occurrence of engine stall.

Figure 20:
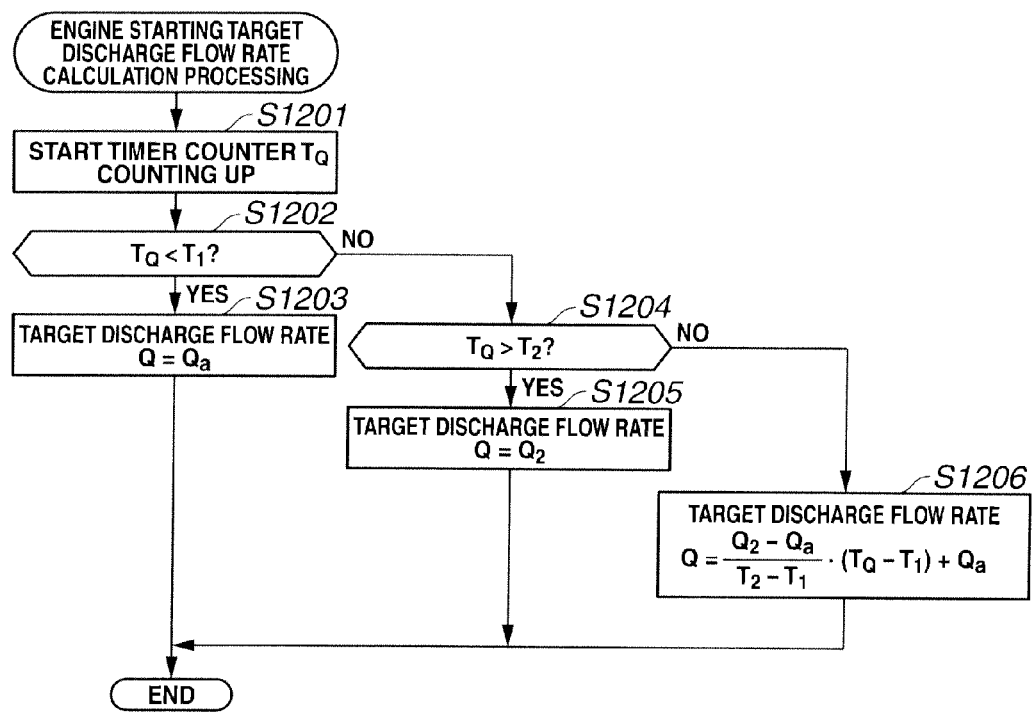
FIG. 20 is a flowchart showing a subroutine of calculation of a target discharge flow rate at engine starting which is executed in a ninth embodiment of the present invention.
Figure 21:
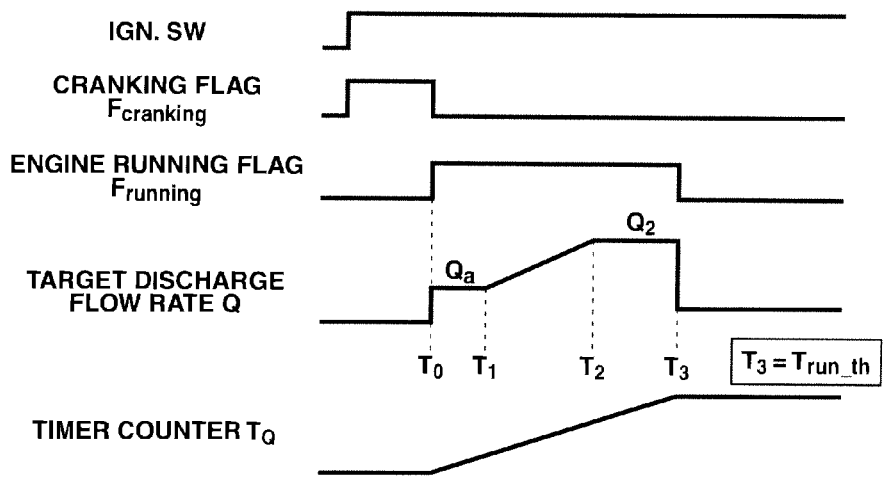
FIG. 21 is a timing chart showing an operation of the pump apparatus according to the ninth embodiment of the present invention upon executing the subroutine of calculation of a target discharge flow rate at engine starting.

Next, a ninth embodiment of the present invention will be explained by referring to FIG. 20 and FIG. 21. The ninth embodiment is basically the same as the first embodiment except for the engine starting target discharge flow rate calculation processing which is executed in step S309 as shown in FIG. 7 of the first embodiment. FIG. 20 is a flowchart showing a subroutine of calculation of a target discharge flow rate at engine starting which is executed in the ninth embodiment. FIG. 21 is a timing chart showing an operation of the pump apparatus according to the ninth embodiment upon executing the subroutine of calculation of a target discharge flow rate at engine starting. In the first embodiment, changeover from the predetermined flow rate 1 to the predetermined flow rate 2 (that is, changeover from the flow rate reduction control to the flow rate increase control) is abruptly carried out. In contrast, in the ninth embodiment, when the changeover from the flow rate reduction control to the flow rate increase control is carried out, an amount of electric current flowing through solenoid 21a is controlled so as to gradually increase.

As shown in FIG. 20, a logic flow starts and goes to step S1201 in which timer counter $T_Q$ is started counting up. The logic flow proceeds to step S1202 in which a determination is made as to whether or not the counted value of timer counter $T_Q$ is less than predetermined value $T_1$.

In a case where in step S1202, it is determined that the counted value of timer counter $T_Q$ is less than predetermined value $T_1$, the logic flow proceeds to step S1203 in which target discharge flow rate Q is set to predetermined discharge flow rate $Q_a$. Predetermined discharge flow rate $Q_a$ is larger than the predetermined flow rate 1 and not more than a half of maximum discharge flow rate $Q_2$. By thus setting target discharge flow rate Q to predetermined discharge flow rate $Q_a$ during a period of time of predetermined value $T_1$, it is possible to ensure a response to a certain extent and suppress occurrence of cavitation.

In a case where in step S1202, it is determined that the counted value of timer counter $T_Q$ is not less than predetermined value $T_1$, the logic flow proceeds to step S1204. In step S1204, a determination is made as to whether or not the counted value of timer counter $T_Q$ is more than predetermined value $T_2$.

In a case where in step S1204, it is determined that the counted value of timer counter $T_Q$ is more than predetermined value $T_2$, the logic flow proceeds to step S1205 in which target discharge flow rate Q is set to predetermined discharge flow rate $Q_2$ which is the predetermined flow rate 2, i.e., the maximum discharge flow rate.

In a case where in step S1204, it is determined that the counted value of timer counter $T_Q$ is not more than predetermined value $T_2$, the logic flow proceeds to step S1206. In step S1206, target discharge flow rate Q which is calculated using the following formula (2) is set so as to gradually increase from predetermined discharge flow rate $Q_a$ to predetermined discharge flow rate $Q_2$ over a predetermined period of time between predetermined value $T_1$ and predetermined value $T_2$ (i.e., $T_2-T_1$).

$$Q=\{(Q_2-Q_a)/(T_2-T_1)\}\cdot(T_Q-T_1)+Q_a \qquad (2)$$

As a result, occurrence of cavitation can be suppressed.

As explained above, the ninth embodiment can attain the following function and effect (20).

(20) In the pump apparatus according to the ninth embodiment, the flow rate increase control is executed by gradually increasing an amount of electric current flowing through solenoid 21a. By gradually increasing the amount of electric current flowing through solenoid 21a upon the flow rate increase control, it is possible to ensure a slow movement of cam ring 20c and thereby suppress occurrence of cavitation due to abruptly increased flow rate.

Figure 22:
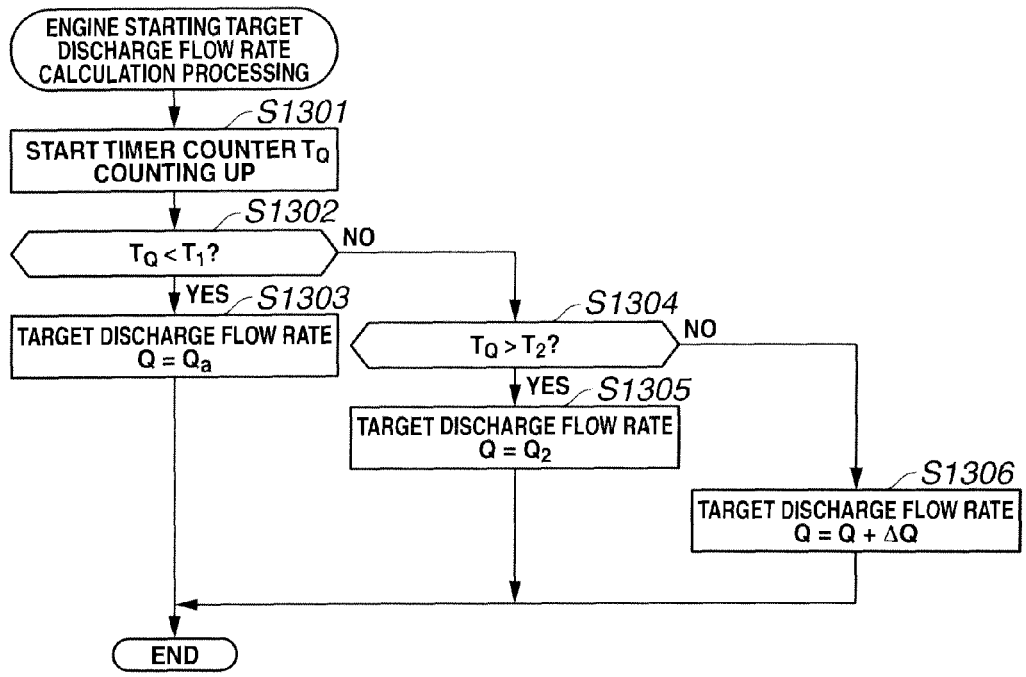
FIG. 22 is a flowchart showing a subroutine of calculation of a target discharge flow rate at engine starting which is executed in a tenth embodiment of the present invention.
Figure 23:
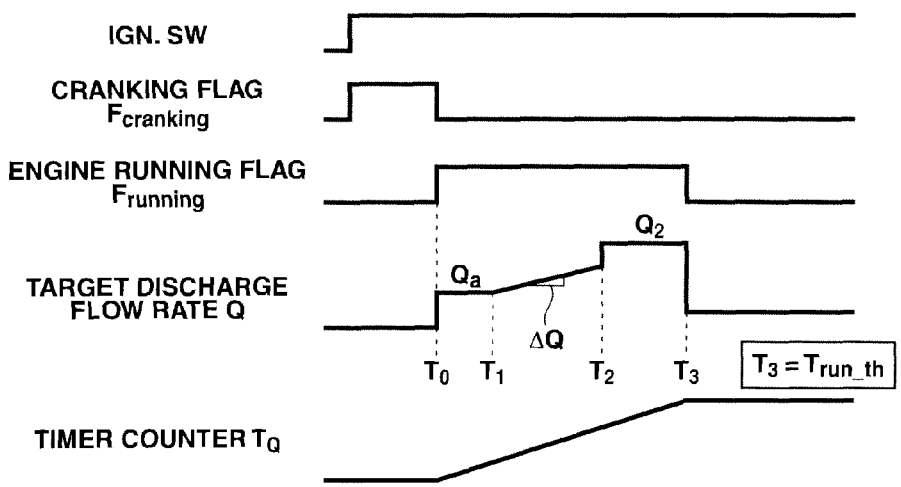
FIG. 23 is a timing chart showing an operation of the pump apparatus according to the tenth embodiment of the present invention upon executing the subroutine of calculation of a target discharge flow rate at engine starting.

Next, a tenth embodiment of the present invention will be explained by referring to FIG. 22 and FIG. 23. The tenth embodiment is basically the same as the ninth embodiment except for the engine starting target discharge flow rate calculation processing. FIG. 22 is a flowchart showing a subroutine of calculation of a target discharge flow rate at engine starting which is executed in the tenth embodiment. FIG. 23 is a timing chart showing an operation of the pump apparatus according to the tenth embodiment upon executing the subroutine of calculation of a target discharge flow rate at engine starting. In the ninth embodiment, target discharge flow rate Q is gradually changed from predetermined discharge flow rate $Q_a$ to predetermined discharge flow rate $Q_2$ over the predetermined period of time (i.e., $T_2-T_1$). In contrast, in the tenth embodiment, target discharge flow rate Q is gradually increased from predetermined discharge flow rate $Q_a$ with predetermined flow rate gradient $\Delta Q$ until the predetermined period of time (i.e., $T_2-T_1$) has elapsed, and then target discharge flow rate Q is changed to the predetermined flow rate 2 (i.e., predetermined discharge flow rate $Q_2$) (see FIG. 23).

Steps S1301 to S1305 as shown in FIG. 22 are the same as steps S1201 to S1205 as shown in FIG. 20 of the ninth embodiment. Step S1306 as shown in FIG. 22 differs from step S1206 as shown in FIG. 20 of the ninth embodiment.

As shown in FIG. 22, in a case where in step S1304, it is determined that the counted value of timer counter $T_Q$ is not more than predetermined value $T_2$, the logic flow proceeds to step S1306. In step S1306, target discharge flow rate Q which is calculated using the following formula (3) is set so as to gradually increase from predetermined discharge flow rate $Q_a$ to the predetermined flow rate 2 (i.e., predetermined discharge flow rate $Q_2$) with predetermined flow rate gradient $\Delta Q$ over the predetermined period of time between predetermined value $T_1$ and predetermined value $T_2$ (i.e., $T_2-T_1$).

$$Q=Q+\Delta Q \quad (3)$$

As a result, the tenth embodiment can attain the same function and effect as those of the ninth embodiment. In addition, since target discharge flow rate Q is obtained by simply adding an increment corresponding to predetermined flow rate gradient $\Delta Q$ to the previous target discharge flow rate Q, a computation load can be reduced.

Figure 24:
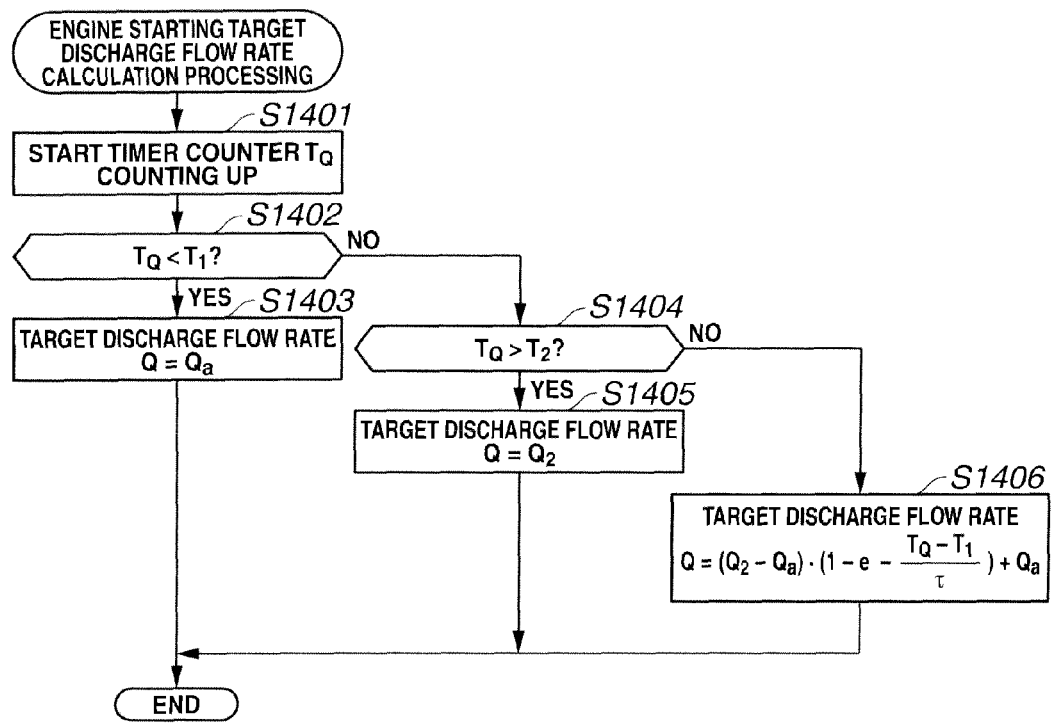
FIG. 24 is a flowchart showing a subroutine of calculation of a target discharge flow rate at engine starting which is executed in an eleventh embodiment of the present invention.
Figure 25:
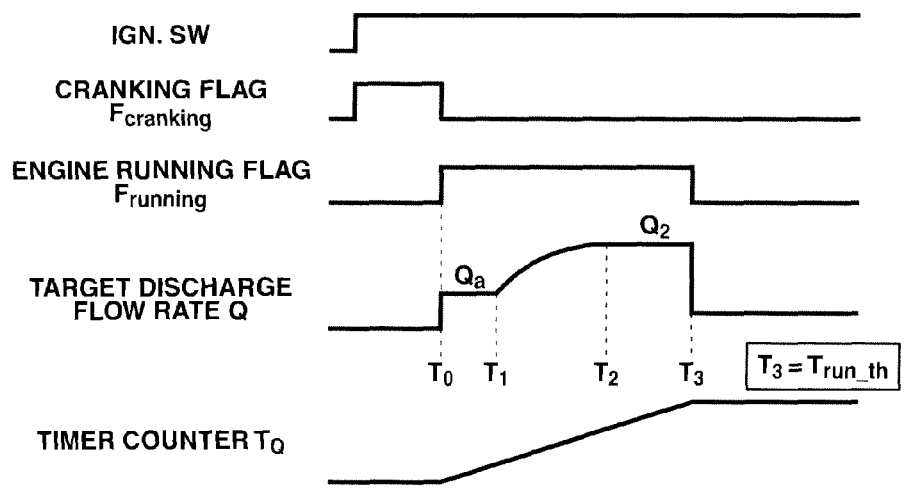
FIG. 25 is a timing chart showing an operation of the pump apparatus according to the eleventh embodiment of the present invention upon executing the subroutine of calculation of a target discharge flow rate at engine starting.

Next, an eleventh embodiment of the present invention will be explained by referring to FIG. 24 and FIG. 25. The eleventh embodiment is basically the same as the ninth embodiment except for the engine starting target discharge flow rate calculation processing. FIG. 24 is a flowchart showing the subroutine of calculation of a target discharge flow rate at engine starting which is executed in the eleventh embodiment. FIG. 25 is a timing chart showing an operation of the pump apparatus according to the eleventh embodiment upon executing the subroutine of calculation of a target discharge flow rate at engine starting. In the eleventh embodiment, target discharge flow rate Q is gradually increased from predetermined discharge flow rate $Q_a$ with an upwardly convex characteristic curve as shown in FIG. 25 until the predetermined period of time (i.e., $T_2-T_1$) has elapsed, and then target discharge flow rate Q is changed to the predetermined flow rate 2 (i.e., predetermined discharge flow rate $Q_2$).

Steps S1401 to S1405 as shown in FIG. 24 are the same as steps S1201 to S1205 as shown in FIG. 20 of the ninth embodiment. Step S1406 as shown in FIG. 24 differs from step S1206 as shown in FIG. 20 of the ninth embodiment.

As shown in FIG. 24, in a case where in step S1404, it is determined that the counted value of timer counter $T_Q$ is not more than predetermined value $T_2$, the logic flow proceeds to step S1406. In step S1406, target discharge flow rate Q which is calculated using the following formula (4) is set so as to gradually increase from predetermined discharge flow rate $Q_a$ to the predetermined flow rate 2 (i.e., predetermined discharge flow rate $Q_2$) with the upwardly convex characteristic curve as shown in FIG. 25 over the predetermined period of time between predetermined value $T_1$ and predetermined value $T_2$ (i.e., $T_2-T_1$).

$$Q=(Q_2-Q_a)\cdot(1-\exp(-(T_Q-T_1)/T))+Q_a \quad (4)$$

wherein, $\tau$ is time constant which is a value to be suitably set on the basis of experimental results. The eleventh embodiment can attain the same function and effect as those of the ninth embodiment.

Figure 26:
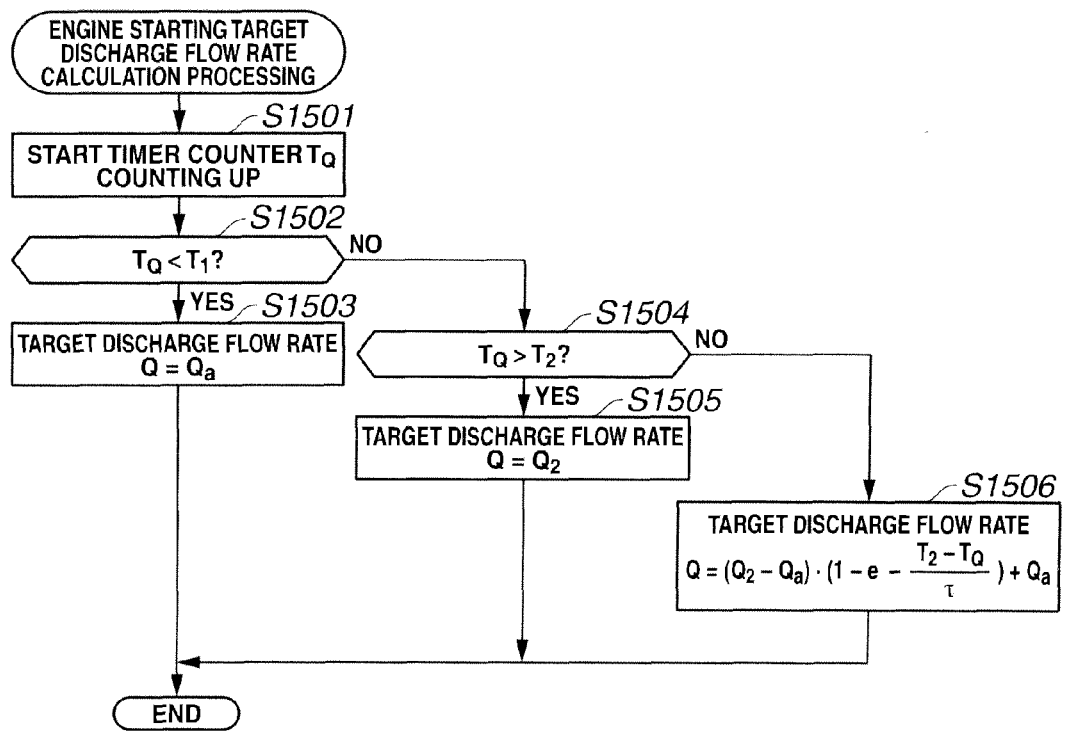
FIG. 26 is a flowchart showing a subroutine of calculation of a target discharge flow rate at engine starting which is executed in a twelfth embodiment of the present invention.
Figure 27:
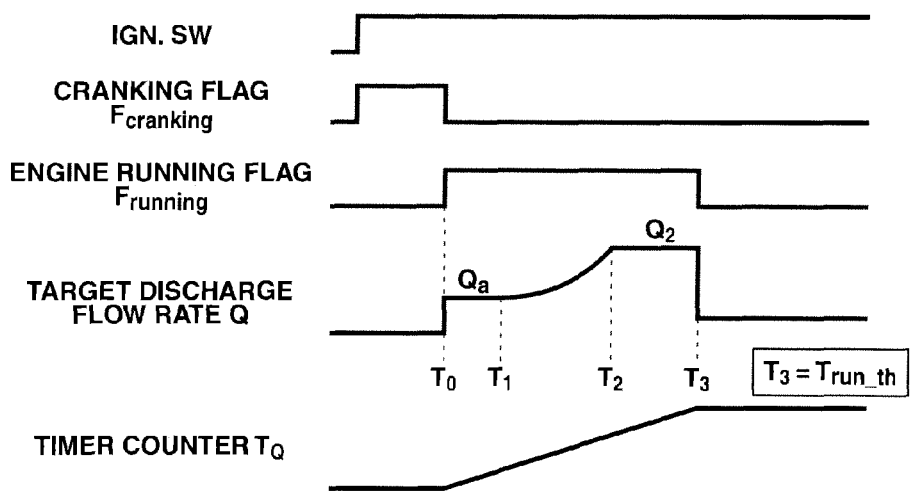
FIG. 27 is a timing chart showing an operation of the pump apparatus according to the twelfth embodiment of the present invention upon executing the subroutine of calculation of a target discharge flow rate at engine starting.

Next, a twelfth embodiment of the present invention will be explained by referring to FIG. 26 and FIG. 27. The twelfth embodiment is basically the same as the eleventh embodiment except for the processing of calculation of a target discharge flow rate at engine starting. FIG. 26 is a flowchart showing a subroutine of calculation of a target discharge flow rate at engine starting which is executed in the twelfth embodiment. FIG. 27 is a timing chart showing an operation of the pump apparatus according to the twelfth embodiment upon executing the subroutine of calculation of a target discharge flow rate at engine starting. In the twelfth embodiment, target discharge flow rate Q is increased from predetermined discharge flow rate $Q_a$ with a downwardly convex characteristic curve as shown in FIG. 27 until the predetermined period of time (i.e., $T_2-T_1$) has elapsed, and then target discharge flow rate Q is changed to the predetermined flow rate 2 (i.e., predetermined discharge flow rate $Q_2$).

Steps S1501 to S1505 as shown in FIG. 26 are the same as steps S1401 to S1405 as shown in FIG. 24 of the eleventh embodiment. Step S1506 as shown in FIG. 26 differs from step S1406 as shown in FIG. 24 of the eleventh embodiment.

As shown in FIG. 26, in a case where in step S1504, it is determined that the counted value of timer counter $T_Q$ is not more than predetermined value $T_2$, the logic flow proceeds to step S1506. In step S1506, target discharge flow rate Q which is calculated using the following formula (5) is set so as to gradually increase from predetermined discharge flow rate $Q_a$ to the predetermined flow rate 2 (i.e., predetermined discharge flow rate $Q_2$) with the downwardly convex characteristic curve as shown in FIG. 27 over the predetermined period of time between predetermined value $T_1$ and predetermined value $T_2$ (i.e., $T_2-T_1$).

$$Q=(Q_2-Q_a)\cdot(1-\exp(-(T_2-T_Q)/\tau))+Q_a \quad (5)$$

wherein, $\tau$ is time constant which is a value to be suitably set on the basis of experimental results. The twelfth embodiment can attain the same function and effect as those of the ninth embodiment.

This application is based on a prior Japanese Patent Application No. 2009-288784 filed on Dec. 21, 2009. The entire contents of the Japanese Patent Application No. 2009-288784 are hereby incorporated by reference.

Although the invention has been described above by reference to certain embodiments of the invention, the invention is not limited to the embodiments as described above. Further variations of the embodiments as described above will occur to those skilled in the art in light of the above teachings. The scope of the invention is defined with reference to the following claims.

What is claimed is:

1. A pump apparatus for supplying a working fluid to a steering apparatus for a vehicle, the pump apparatus comprising:
   a pump housing having a pump element accommodating portion;
   a drive shaft rotatably supported by the pump housing;
   a cam ring movably disposed in the pump element accommodating portion;
   a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft, and a solenoid which is drivingly controlled on a basis of a steering condition and a vehicle speed, the solenoid being operated to control the eccentric amount of the cam ring, wherein the solenoid is controlled to execute a flow rate reduction control during cranking of an engine of the vehicle in which the cam ring is allowed to move in such a direction as to reduce the specific discharge quantity, and wherein the solenoid is controlled to execute a flow rate increase control after the cranking is ended in which the cam ring is allowed to move in such a direction as to increase the specific discharge quantity.

2. The pump apparatus as claimed in claim 1, wherein the flow rate increase control is executed by controlling the solenoid on a basis of an output signal from an engine control unit which controls the engine of the vehicle.

3. The pump apparatus as claimed in claim 2, wherein the flow rate increase control is executed under a warming up condition of the engine.

4. The pump apparatus as claimed in claim 3, wherein in a case where an accelerator pedal is not operated and an engine speed value is not less than a predetermined speed value, it is determined that the engine is under the warming up condition, and the solenoid is controlled to execute the flow rate increase control.

5. The pump apparatus as claimed in claim 3 wherein in a case where it is determined that the engine is under the warming up condition on a basis on an output signal from a temperature sensor which detects an engine cooling water temperature or an oil temperature of the working oil, the solenoid is controlled to execute the flow rate increase control.

6. The pump apparatus as claimed in claim 1, wherein the solenoid is controlled to execute the flow rate increase control when a predetermined period of time has elapsed from a time at which the cranking is started.

7. The pump apparatus as claimed in claim 1, wherein the flow rate increase control is executed by gradually increasing an amount of electric current flowing through the solenoid.

8. The pump apparatus as claimed in claim 1, wherein the solenoid is controlled such that as an engine cooling water temperature, an engine oil temperature or an oil temperature of the working oil in the steering apparatus becomes lower, a period of time over which the flow rate increase control is executed is increased.

9. A pump apparatus for supplying a working fluid to a steering apparatus for a vehicle, the pump apparatus comprising:

a pump housing having a pump element accommodating portion;

a drive shaft rotatably supported by the pump housing;

a cam ring movably disposed in the pump element accommodating portion;

a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft and a solenoid which is drivingly controlled on a basis of a steering condition and a vehicle speed, the solenoid being operated to control the eccentric amount of the cam ring, wherein the solenoid is controlled to execute a flow rate reduction control during cranking of an engine of the vehicle in which the cam ring is allowed to move in such a direction as to reduce the specific, discharge quantity, and wherein the solenoid is controlled such that in a case where a rotational speed of the drive shaft is constant, the specific discharge quantity is minimized when the solenoid is in a de-energized state, and the specific discharge quantity is increased as an amount of electric current flowing through the solenoid becomes larger.

10. The pump apparatus as claimed in claim 9, wherein the solenoid is held in the de-energized state thereof during the cranking.

11. A pump apparatus for supplying a working fluid to a steering apparatus for a vehicle, the pump apparatus comprising:

a pump housing having a pump element accommodating portion;

a drive shaft rotatably supported by the pump housing;

a cam ring movably disposed in the pump element accommodating portion;

a pump element disposed within the cam ring, the pump element being rotationally driven by the drive shaft to suck the working fluid and discharge the working fluid sucked and vary a specific discharge quantity which is a discharge quantity of the working oil per one rotation of the pump element in accordance with variation in eccentric amount of the cam ring with respect to the drive shaft, a steering condition detecting means for detecting or calculating a steering angle, a steering angular velocity or a steering angular acceleration and outputting a steering condition detection signal indicative of the steering angle, the steering angular velocity or the steering angular acceleration;

a solenoid which is operated to control the eccentric amount of the cam ring; and a control unit configured to determine a solenoid driving signal to drivingly control the solenoid in accordance with the steering condition detection signal and a vehicle speed and output the solenoid driving signal to the solenoid, wherein the control unit is configured to control the solenoid so as to allow the cam ring to move in such a direction as to reduce the specific discharge quantity during cranking of an engine of the vehicle.

12. The pump apparatus as claimed in claim 11, wherein the control unit is further configured to:

determine starting of the engine on a basis of an output signal from an engine control unit which controls the engine; and control the solenoid so as to allow the cam ring to move in such a direction as to increase the specific discharge quantity after the engine is started.

13. The pump apparatus as claimed in claim 11, wherein the control unit is further configured to: control the solenoid so as to allow the cam ring to move in such a direction as to increase the specific discharge quantity at a time at which a predetermined period of time has elapsed from starting of the cranking.

* * * * *